(12) United States Patent
Durand et al.

(10) Patent No.: US 11,568,315 B2
(45) Date of Patent: Jan. 31, 2023

(54) SYSTEMS AND METHODS FOR LEARNING USER REPRESENTATIONS FOR OPEN VOCABULARY DATA SETS

(71) Applicant: ROYAL BANK OF CANADA, Toronto (CA)

(72) Inventors: Thibaut Durand, Vancouver (CA); Gregory Mori, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 476 days.

(21) Appl. No.: 16/826,215

(22) Filed: Mar. 21, 2020

(65) Prior Publication Data
US 2020/0302340 A1 Sep. 24, 2020

Related U.S. Application Data

(60) Provisional application No. 62/822,491, filed on Mar. 22, 2019.

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| 9,990,687 | B1* | 6/2018 | Kaufhold | G06K 9/6247 |
| 10,019,438 | B2* | 7/2018 | Audhkhasi | G06F 40/40 |
| 10,026,020 | B2* | 7/2018 | Jin | G06V 10/82 |
| 11,113,598 | B2* | 9/2021 | Socher | G06F 16/3347 |

OTHER PUBLICATIONS

Durand, IEEE, 2020, pp. 9766-9775.*
Gunther, Arxiv, 2017, sections 1-6.*
Kodirov, Arxiv, 2017, sections 1-6.*
Li, 2018, Elsevier, pp. 701-711.*
Li, 2019, Elsevier, pp. 356-365.*
Toor, Elsevier, 2018, pp. 29-37.*

(Continued)

*Primary Examiner* — Michael I Ezewoko
(74) *Attorney, Agent, or Firm* — Norton Rose Fulbright Canada LLP

(57) ABSTRACT

Systems and methods adapted for training a machine learning model to predict data labels are described. The approach includes receiving a first data set comprising first data objects and associated first data labels, and processing, with a user representation model, respective first data objects and associated data labels associated with a unique user representation by fusing the respective first data object and the associated first data labels. First data object representations of the respective first data objects are generated, and the first data object representations and the user representation model outputs are fused to create a user conditional object representation. The machine learning model updates corresponding parameters based on an error value based on a maximum similarity of the projections of the respective user conditional object representation and first data labels in a joint embedding space.

16 Claims, 10 Drawing Sheets

(56) References Cited

OTHER PUBLICATIONS

Xian, Arviv, 2016, sectons 1-6.*
E. Kodirav et al., "Semantic Autoencoder for Zero-Shot Learning," in Proceedings of the IEEE Conference on Computer Vision and Pattern Recognition (CVPR), 2017, pp. 3174-3183.
M. Günther et al., "Unconstrained Face Detection and Open-Set Face Recognition Challenge," 2017 IEEE International Joint Conference on Biometrics (IJCB), 2017, pp. 697-706.
Y. Xian et al., "Latent Embeddings for Zero-Shot Classification," 2016 IEEE Conference on Computer Vision and Pattern Recognition (CVPR), 2016, pp. 69-77.
F. Faghri et al., "VSE++: Improved Visual-Semantic Embeddings," in British Machine Vision Conference (BMVC), 2018.
J.-H. Kim et al., "Hadamard Product for Low-rank Bilinear Pooling," in International Conference on Learning Representations (ICLR), 2017.
Z. Akata, F. Perronnin, Z. Harchaoui, and C. Schmid. Label-Embedding for Image Classification. IEEE Transactions on Pattern Analysis and Machine Intelligence (TPAMI), 2016. 3.
Z. Akata, S. Reed, D.Walter, H. Lee, and B. Schiele. Evaluation of output embeddings for fine-grained image classification. In IEEE Conference on Computer Vision and Pattern Recognition (CVPR), 2015. 3.
J. Ba, K. Swersky, S. Fidler, and R. Salakhutdinov. Predicting Deep Zero-Shot Convolutional Neural Networks using Textual Descriptions. In IEEE International Conference on Computer Vision (ICCV), 2015. 3.
H. Ben-younes, R. Cadene, M. Cord, and N. Thome. MUTAN: Multimodal Tucker Fusion for Visual Question Answering. In IEEE International Conference on Computer Vision (ICCV), 2017 7, 10.
P. Bojanowski, E. Grave, A. Joulin, and T. Mikolov. Enriching Word Vectors with Subword Information. In Transactions of the Association for Computational Linguistics, 2017. 5.
M. Bucher, S. Herbin, and F. Jurie. Improving Semantic Embedding Consistency by Metric Learning for Zero-Shot Classification. In European Conference on Computer Vision (ECCV), 2016. 3.
M. Carvalho, R. Cadne, D. Picard, L. Soulier, N. Thome, and M. Cord. Cross-Modal Retrieval in the Cooking Context: Learning Semantic Text-Image Embeddings. In ACM Special Interest Group on Information Retrieval (SIGIR), 2018. 3.
W.-L. Chao, S. Changpinyo, B. Gong, and F. Sha. An Empirical Study and Analysis of Generalized Zero-Shot Learning for Object Recognition in the Wild. In European Conference on Computer Vision (ECCV), 2016. 3.
J. Chung, C. Gulcehre, K. Cho, and Y. Bengio. Empirical Evaluation of Gated Recurrent Neural Networks on Sequence Modeling. In Advances in Neural Information Processing Systems Workshop (NeurIPS), 2014. 5, 6.
J. Deng, O. Russakovsky, J. Krause, M. S. Bernstein, A. Berg, and L. Fei-Fei. Scalable Multi-label Annotation. In Proceedings of the SIGCHI Conference on Human Factors in Computing Systems, 2014. 1.
E. Denton, J. Weston, M. Paluri, L. Bourdev, and R. Fergus. User conditional hashtag prediction for images. In International Conference on Knowledge Discovery and Data Mining (KDD), 2015. 1, 2, 4, 5, 7, 8.
B. Dhingra, Z. Zhou, D. Fitzpatrick, M. Muehl, and W. W. Cohen. Tweet2Vec: Character-Based Distributed Representations for Social Media. In Association for Computational Linguistics (ACL), 2016. 1.
B. Duke and G. W. Taylor. Generalized Hadamard-Product Fusion Operators for Visual Question Answering. In arXiv 1803.09374, 2018. 2, 7.
M. Engilberge, L. Chevallier, P. Prez, and M. Cord. Finding beans in burgers: Deep semantic-visual embedding with localization. In IEEE Conference on Computer Vision and Pattern Recognition (CVPR), 2018. 3.

A. Frome, G. Corrado, J. Shlens, S. Bengio, J. Dean, M. Ranzato, and T. Mikolov. DeViSE: A Deep Visual-Semantic Embedding Model. In Advances in Neural Information Processing Systems (NeurIPS), 2013. 3.
J. Fu, Y. Wu, T. Mei, J. Wang, H. Lu, and Y. Rui. Relaxing From Vocabulary: Robust Weakly-Supervised Deep Learning for Vocabulary-Free Image Tagging. In IEEE International Conference on Computer Vision (ICCV), 2015. 3.
A. Fukui, D. H. Park, D. Yang, A. Rohrbach, T. Darrell, and M. Rohrbach. Multimodal Compact Bilinear Pooling for Visual Question Answering and Visual Grounding. In Conference on Empirical Methods in Natural Language Processing (EMNLP), 2016. 2, 4, 7.
A. Gordo, J. Almazan, N. Murray, and F. Perronnin. LEWIS: Latent Embeddings for Word Images and their Semantics. In IEEE International Conference on Computer Vision (ICCV), 2015. 3.
A. Gordo, J. Almazan, J. Revaud, and D. Larlus. End-to-end Learning of Deep Visual Representations for Image Retrieval. In International Journal of Computer Vision (IJCV), 2017. 3.
K. He, X. Zhang, S. Ren, and J. Sun. Deep residual learning for image recognition. In IEEE Conference on Computer Vision and Pattern Recognition (CVPR), 2016. 1, 3, 6.
H. Izadinia, B. C. Russell, A. Farhadi, M. D. Hoffman, and A. Hertzmann. Deep Classifiers from Image Tags in the Wild. In ACM Multimedia, 2015. 1, 2.
A. Joulin, L. van der Maaten, A. Jabri, and N. Vasilache. Learning Visual Features from LargeWeakly Supervised Data. In European Conference on Computer Vision (ECCV), 2016. 6.
J. Johnson, L. Ballan, and L. Fei-Fei. Love Thy Neighbors: Image Annotation by Exploiting Image Metadata. In IEEE International Conference on Computer Vision (ICCV), 2015. 1.
D. P. Kingma and J. Ba. Adam: A Method for Stochastic Optimization. In International Conference on Learning Representations (ICLR), 2015. 6.
R. Kiros, R. Salakhutdinov, and R. S. Zemel. Unifying Visual-Semantic Embeddings with Multimodal Neural Language Models. In arXiv 1411.2539, 2014. 3.
A. Krizhevsky, I. Sutskever, and G. Hinton. ImageNet Classification with Deep Convolutional Neural Networks. In Advances in Neural Information Processing Systems (NeurIPS), 2012. 1, 3.
A. Kuznetsova, H. Rom, N. Alldrin, J. Uijlings, I. Krasin, J. Pont-Tuset, S. Kamali, S. Popov, M. Malloci, T. Duerig, and V. Ferrari. The Open Images Dataset V4: Unified image classification, object detection, and visual relationship detection at scale. In arXiv 1811.00982, 2018. 1.
C. H. Lampert, H. Nickisch, and S. Harmeling. Learning to detect unseen object classes by between-class attribute transfer. In IEEE Conference on Computer Vision and Pattern Recognition (CVPR), 2009. 3.
C. H. Lampert, H. Nickisch, and S. Harmeling. Attribute-based classification for zero-shot visual object categorization. IEEE Transactions on Pattern Analysis and Machine Intelligence (TPAMI), 2014. 3.
D. Mahajan, R. Girshick, V. Ramanathan, K. He, M. Paluri, Y. Li, A. Bharambe, and L. van der Maaten. Exploring the Limits of Weakly Supervised Pretraining. In European Conference on Computer Vision (ECCV), 2018. 1, 6.
J. McAuley and J. Leskovec. Image Labeling on a Network: Using Social-Network Metadata for Image Classification. In European Conference on Computer Vision (ECCV), 2012. 1.
T. Mikolov, I. Sutskever, K. Chen, G. S. Corrado, and J. Dean. Distributed Representations of Words and Phrases and their Compositionality. In Advances in Neural Information Processing Systems (NeurIPS), 2013. 5.
J. Pennington, R. Socher, and C. D. Manning. Glove: Global vectors for word representation. In Conference on Empirical Methods in Natural Language Processing (EMNLP), 2014. 3, 5, 6.
M. Rohrbach, M. Stark, and B. Schiele. Evaluating knowledge transfer and zero-shot learning in a large-scale setting. In IEEE Conference on Computer Vision and Pattern Recognition (CVPR), 2011. 3.
A. Salvador, N. Hynes, Y. Aytar, J. Marin, F. Ofli, I.Weber, and A. Torralba. Learning Cross-modal Embeddings for Cooking Recipes

(56) References Cited

OTHER PUBLICATIONS and Food Images. In IEEE Conference on Computer Vision and Pattern Recognition (CVPR), 2017. 3.

S. Shankar, Y. Halpern, E. Breck, J. Atwood, J. Wilson, and D. Sculley. No Classification without Representation: Assessing Geodiversity Issues in Open Data Sets for the Developing World. In NIPS 2017 workshop: Machine Learning for the Developing World, 2017. 2.

K. Shuster, S. Humeau, H. Hu, A. Bordes, and J. Weston. Engaging Image Captioning Via Personality. In arXiv 1810.10665, 2018. 2, 3.

C. Sun, A. Shrivastava, S. Singh, and A. Gupta. Revisiting Unreasonable Effectiveness of Data in Deep Learning Era. In IEEE International Conference on Computer Vision (ICCV), 2017. 1, 6.

B. Thomee, B. Elizalde, D. A. Shamma, K. Ni, G. Friedland, D. Poland, D. Borth, and L.-J. Li. YFCC100M: The New Data in Multimedia Research. Communications of the ACM, 2016. 7.

A. Veit, S. Belongie, and T. Karaletsos. Conditional Similarity Networks. In IEEE Conference on Computer Vision and Pattern Recognition (CVPR), 2017. 3.

A. Veit, M. Nickel, S. Belongie, and L. van der Maaten. Separating Self-Expression and Visual Content in Hashtag Supervision. In IEEE Conference on Computer Vision and Pattern Recognition (CVPR), 2017. 1, 2, 4, 5, 6, 7, 8, 14.

N. Vo, L. Jiang, C. Sun, K. Murphy, L.-J. Li, L. Fei-Fei, and J. Hays. Composing Text and Image for Image Retrieval—An Empirical Odyssey. In arXiv 1812.07119, 2018. 3, 9, 10.

L. Wang, Y. Li, J. Huang, and S. Lazebnik. Learning Two-Branch Neural Networks for Image-Text Matching Tasks. In IEEE Transactions on Pattern Analysis and Machine Intelligence (TPAMI), 2018. 3.

L. Wang, Y. Li, and S. Lazebnik. Learning Deep Structure-Preserving Image-Text Embeddings. In IEEE Conference on Computer Vision and Pattern Recognition (CVPR), 2015. 3.

Y.-X. Wang, D. Ramanan, and M. Hebert. Learning to Model the Tail. In Advances in Neural Information Processing Systems (NeurIPS), 2017. 4.

J. Weston, S. Chopra, and K. Adams. # tagspace: Semantic embeddings from hashtags. In Conference on Empirical Methods in Natural Language Processing (EMNLP), 2014. 1, 2, 5.

Y. Xian, C. H. Lampert, B. Schiele, and Z. Akata. Zero-Shot Learning—A Comprehensive Evaluation of the Good, the Bad and the Ugly. In IEEE Transactions on Pattern Analysis and Machine Intelligence (TPAMI), 2018. 3.

Z. Yu, J. Yu, J. Fan, and D. Tao. Multi-modal Factorized Bilinear Pooling with Co-Attention Learning for Visual Question Answering. In IEEE International Conference on Computer Vision (ICCV), 2017. 2, 7.

Z. Zhang and V. Saligrama. Zero-shot learning via semantic similarity embedding. In IEEE International Conference on Computer Vision (ICCV), 2015. 3.

\* cited by examiner

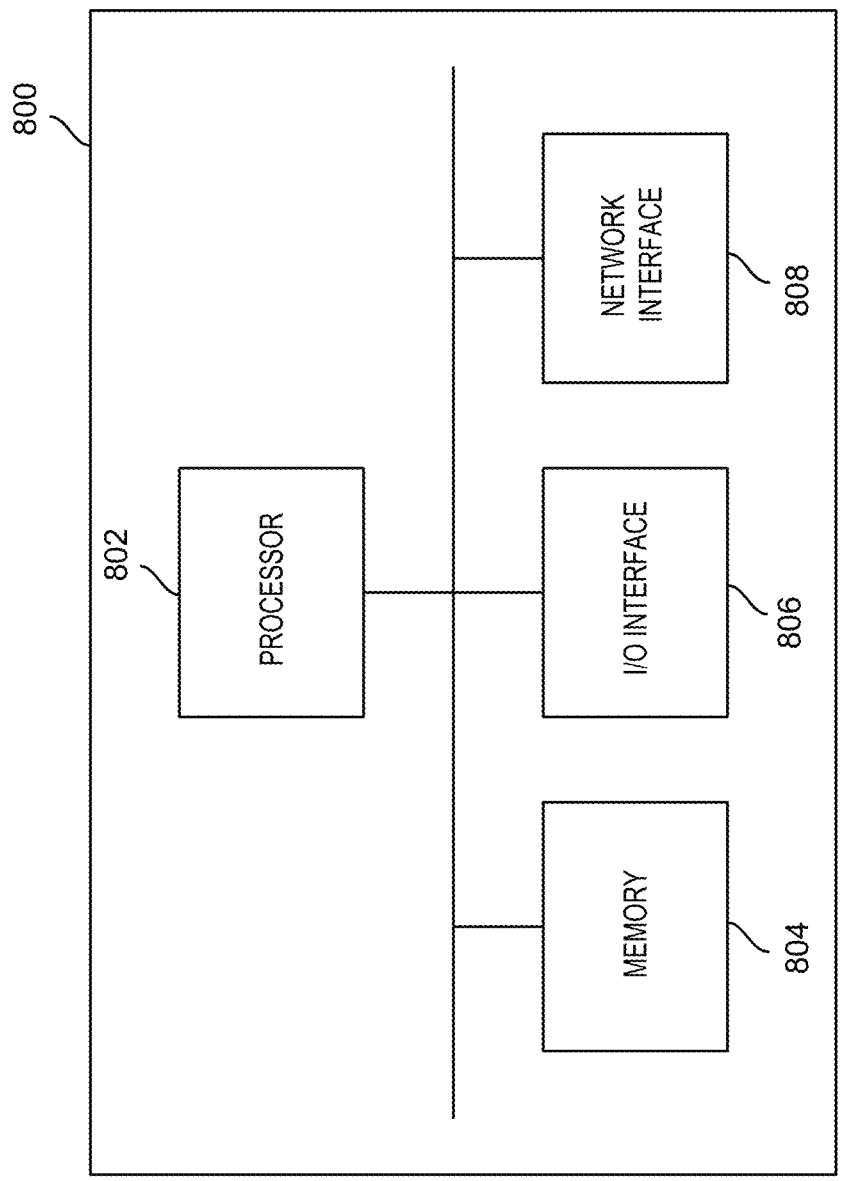

SYSTEMS AND METHODS FOR LEARNING USER REPRESENTATIONS FOR OPEN VOCABULARY DATA SETS

CROSS-REFERENCE

This application is a non-provisional of, and claims all benefit, including priority to, U.S. Provisional Application No. 62/822,491, entitled "SYSTEMS AND METHODS FOR LEARNING USER REPRESENTATIONS FOR OPEN VOCABULARY DATA SETS", filed on Mar. 22, 2019, incorporated herein by reference in its entirety.

FIELD

The present disclosure generally relates to the field of machine learning models, and more specifically, directed to systems and methods for machine learning models for predicting data labels.

INTRODUCTION

Recent works show that a strategy to improve the classification models (e.g., image classification models), alternatively referred to herein as machine learning models for predicting data labels, is to train them with more data. There may be a lack of large scale multi-label datasets available, or large scale multi-label datasets may be prohibitively expensive to gain access to. Collecting large scale multi-label datasets that are available can be expensive and time consuming. Large scale multi-label datasets may also require human supervision for annotating data labels.

One approach to overcome data availability specific to image classification models is to use images from social media with pre-existing user-assigned hashtags, because social media image data can be a source of a large scale multi-label training data set that is available in great abundance. Hashtags, however, are inherently subjective because they are provided by users as a form of self-expression. Hashtags may have synonyms (different hashtags referring to the same image) or may be ambiguous (the same hashtag referring to different images). This self-expression leads to user-specific variation in hashtags that is independent of the image content, and therefore limits the effectiveness of standard image classification models.

To overcome this problem, user-specific models that model the joint distribution of images, hashtags and users, as opposed to image-hashtag pairs in classic image classification models, have been proposed. In proposed user-specific hashtag models, each user is represented by a user embedding which is learned jointly with the model parameters. User-specific hashtag models which rely on the user embedding cannot be used on new users.

Proposed hashtag prediction models for image or text may also be limited to learning a single embeddings for each hashtag. These models require an approach to define the vocabulary of hashtags before training, and lack the ability to correctly predict new hashtags (alternatively referred to as unseen hashtags, as unseen hashtags are not present in the training data) without retraining the model. Models reliant upon a fixed hashtag vocabulary are further limited because social networks are constantly evolving and new hashtags appear all the time.

Machine learning models which improve machine learning models for predicting data labels, by improving prediction accuracy, training speed, or may be able to account for user subjectivity are desirable.

SUMMARY

Systems and methods for machine learning models for predicting data labels are described herein in various embodiments.

Learning user representations presents challenging technical problems where the data label data set and the data object data sets are open ended. Data labels and data objects continuously evolve over time, introducing for example, new vocabulary or image types that a user representation must incorporate.

As described further, training machine learning models for predicting data labels presents challenging technical problems because predicting accurate data labels requires incorporating user specific bias and subjectivity in assigning data labels to data objects, which are incorporated into training data sets. Training a machine learning model with subjective data labels is difficult because model accuracy may be reliant upon the interrelationships not only between the user and the data label or data object, for instance a user's likelihood to assign certain data labels to certain data objects, but also the correlations between the data labels and the data objects themselves.

As described herein, machine learning models for predicting data labels, comprise a plurality of parameters, including a plurality of parameters representative of a user representation model for encoding information between the user assigning the data label and the correlations between the data labels and the data objects themselves. For example, in an example embodiment where the data labels are company IDs (alternatively referred to as payee IDs) associated with dates that a payee was added by a user to an automated payment system (e.g., data objects), a user representation may seek to encode the company IDs of payees likely to be used by a user based on the date that the payee is being added. The encoding may capture interrelationships between the payee ID and the user, for example a user may be more likely to assign payee IDs which are in a certain proximity to the user's residence. The encoding may capture a language preference (English, Spanish, French, etc.), which may impact the type of payee ID used, for example where specific payees provide services in a user's preferred language. The encoding may capture a user's service type preference (banking, sporting goods, etc.), while also capturing the correlations between the company IDs and the dates payees may be added (for example, some industries may exhibit tendencies of new agreements starting, for example, rents turning over at a certain period of time).

According to some embodiments, an example first aspect comprises a system which receives a first data set comprising one or more first data objects (e.g., a date that a payee was added to an automated payment system) and one or more first data labels (e.g., payee ID) associated with the one or more first data objects (alternatively referred to as data object-data label pairs, or object-label pairs). Each of the one or more first data objects (and associated one or more first data labels) are associated with a user (e.g., the user adding the payee to the automated payment system), represented by user data, reflecting the user labelling the data label.

According to example embodiments, the first data objects are dates when a user added a payee to an automated payment system, the first data labels comprise company IDs associated with the respective date the user added the payee to a list of payees. The user data may set includes information about the user (e.g., account number, age, occupation, etc.).

According to example embodiments, the first data objects may comprise image data, and the first data labels may be hashtags assigned to the respective first data object.

In the example first aspect, the machine learning model for predicting data labels is trained with the first data set. The machine learning model processes the one or more first data objects and associated one or more first data labels associated with a user represented by the user data with the user representation model. The user representation model generates a user representation model output by fusing a first data object and each first data label associated with the respective first data object. For example, the user representation model output may be a vector which represents the likelihood of a particular user adding a specific payee to an automated payment system at a specific date.

Fusing each of the first data objects and the respective associated one or more first data labels may include, (1) generating a second data object representation of the respective first data object (e.g., separate from the first data object representation set out below), (2) generating a first data label representation for a sum of the one or more first data labels (e.g., a summation of all payee IDs added on a particular date by a user) associated with the respective first data object, and (3) fusing the second data object representation and the first data label representation. For example, each payee ID associated with a date may be processed (e.g., a first data label representation), and the aggregate (e.g., sum) of the processed payee IDs may be fused with a representation of the date (e.g., the first data object representation).

In the example first aspect, the machine learning model for predicting data labels processes the fused first data object and respective associated one or more first data labels with a plurality of parameters for capturing sequential relationships within data (e.g., a long short term memory (LS™), or a gated recurrent unit (GRU)) to store interrelationships between sequential fused second data object representations and first data label representations. For example, an LS™ may be incorporated into the user representation model to capture interrelations between sequential payee ID—date pairs processed by the LS™. For example, the LS™ may preferentially store information about recent company ID—date pairs, which may increase the accuracy of the machine learning model in predicting a payee ID that the user is likely to add at a later date. In example embodiments, the GRU may similarly incorporate user tendencies associated with the sequential payee ID—date pairs (e.g., a users changing taste for adding retailers, for example children introducing new payee IDs to sign up for payment, such as camps).

Training the machine learning model in the example first aspect further comprises, for each first data object, generating a first data object representation.

In example embodiments, the first data object may be processed by a convolutional neural network to generate a first data object representation, and training the convolutional neural network calibrate the convolutional neural network to determine features responsive to the machine learning model error value (alternatively referred to herein as a training error). For example, the convolutional neural network may learn during training to determine the image features which improve the accuracy of the machine learning model in predicting hashtags.

According to some embodiments, for example, generating a data object representation may comprise processing a date when a payee was added to an automated payment system with a convolutional neural network to determine which aspects of the date are important to determining subsequent payees.

In example embodiments, the data object representation may be generated in part by an encoder/decoder pair.

Training the machine learning model in the example first aspect may further comprise fusing the first data object representation and the user representation model output to generate a user conditional object representation. In this manner, the trained machine learning model may encode not only some information about the user but also the correlations between the data labels and the data objects themselves.

In example embodiments, fusing the first data object representation and the user representation model output comprises passing the first data object representation and the user representation model output through a bilinear operator for capturing multi-model (e.g., where a first mode is the data object, and the second mode is the data label) interactions. In example embodiments, a Multimodal Tucker Fusion (MUTAN) model for approximating bilinear operators is used to generate the user conditional object representation, A MUTAN model may be used in place of a bilinear operator where computing resources are unavailable, or where the bilinear operator is unable to be implemented.

Training the machine learning model according to the example first aspect may further comprise generating a joint embedding space for comparing the user conditional data object representation and the respective first data label associated with the respective first data object. In this way, for example, the respective first data label associated with the first data object can be compared to the user conditional data object representation generated by the machine learning model in a vector space, and the machine learning model can be trained to increase the similarity between the user conditional data object representation and the respective first data label (or first data label representation), encouraging correct data labelling.

An error value based on a joint embedding space distance in the joint embedding space between the respective user conditional object representation and the respective first data label representation may be used to train the machine learning model to learn to generate accurate data labels. For example, the error may represent the degree of error between the user conditional data object representation, which is representative of the machine learning model's estimation of a predicted data label that would be assigned by a user to an unlabelled data object, and the label assigned to the data object by the user. In certain circumstances, the error may represent the difference between the predicted payee ID being added on a date and the payee ID that was selected by the user.

The error value can be used to update each of the plurality of the parameters of each constituent plurality of parameters within the machine learning model to encourage similarity between the user conditional data object representation, which may be representative of the data label predicted by the machine learning model, and the respective first data label. For example, the plurality of parameters representative of the user representation model may be updated to generate user representation model outs which allow for more accurate data label predictions.

Training the machine learning model can comprise initiating a value for each of the plurality of parameters which represent the machine learning model, processing each of the first data objects with the machine learning models, and updating the plurality of parameters based on the error value for each of the first data objects.

The adjusted plurality of parameters learned during training, representative of the trained machine learning model, may be stored on a computer memory. The stored trained machine learning model allow for retrieval and subsequent use of the machine learning model to process new data sets. According to some example embodiments, the various parameters of the machine learning model may be stored in separate computer memories, for example the user representation model may be stored in a first computer memory and the remainder of the machine learning model may be stored in a second computer memory.

Because the user representation model processes the first data objects and the associated first data labels, in some example embodiments, the user representation model can be trained independently of the machine learning model. For example, the user representation model may be updated periodically to account for new user tendencies, self training to generate a user representation model output which may accurately capture the interrelationships between the first data objects and the first data labels used for training.

According to some embodiments, for example, the user representation model can be trained in parallel with two separate first data objects and the associated first data labels for two separate users. For example, two instances of the parameters representative of the user representation model can be used to process the data object-data label pairs associated with separate users. Subsequently the parameter values of the two instances of the user representation model may be aggregated.

The output of the trained machine learning model may be based on determining a data label representation in the joint embedding space nearest to a user conditional object representation projection. For example, where the user conditional object representation projection is closest to a value associated with a company ID projection known to the trained machine learning model.

According to some embodiments, the output may be a series of data labels and a likelihood of each data label in the series of data labels. For example, the machine learning model may predict that there is a 40% likelihood that the data label, based on the date the payee is being added, is the company ID associated with "Sprint™", and a 60% chance that the payee intended to add the company ID associated with the Bank of America™ as the data label.

The output of the machine learning model can be a vector of the user conditional representation mapped onto the joint embedding space. The output may be a fixed dimensional vector that requires further processing with a model, such as GloVe, in order to be further interpreted. For example, the vector may be store data interrelationships between predicted data labels that are based on pre-processing of the data sets.

According to some example embodiments, where the first data objects comprise date information of when a payee was added, the first data labels comprise company IDs of payees, the user data comprises a user name or account number, the machine learning model is trained to predict a payee ID of a subsequent payee. For example, where a user is in the process of switching wireless data service providers, a trained machine learning model may predict that a payee ID of a subsequent payee for the wireless data service provider is, for example, Sprint™ and display the predicted company ID of the subsequent payee as a first option to the user. The machine learning model may, by predicting subsequent payees, improve a bill payment process.

To summarize, training the machine learning model may comprise sequentially processing individual first data objects, and their associated one or more first data label(s), with the user representation model to generate the user representation model output. The first data object provided to the user representation model is processed by a data object representation model to generate the first data object representation. The user representation model output and the first data object representation may be fused to generate the user conditional object representation. The user conditional object representation, and the first data label representation, generated by processing the first data label provided to the user representation model with the data label representation model, may be mapped into the joint embedding space. The error value may be based on the joint embedding space distance between the user conditional object representation and the first data label representation, and the machine learning model may update the plurality of parameters prior to processing the subsequent data object-data label pairs based on the error value.

According to example embodiments, the first data set may comprise organizational information, such as images within a corporate system (e.g., data objects), and corresponding data labels which may be file names. The user data can be representative of the user that assigned the filename, and the machine learning model may predict data labels for unlabelled images, such as legacy images, within the corporate system.

In some embodiments, for example, the data labels and data objects may comprise open ended values. For example, the data objects may not be limited to a particular class or group, and similarly the data labels may not be limited to a particular set of labels.

The machine learning model may utilize data label representations in place of data labels. Data label representations generated via data label representation models can share information between data labels within training data and data labels not within the training data, so that the knowledge learned from training data labels can be transferred to data labels which are not present in the training data. For example, pre-trained word embedding algorithms such as GloVe, may be used to process the data labels prior to training the machine learning algorithm. In example embodiments, the data label representation models are embedded into the machine learning model so that training the machine learning model includes updating the parameters which optimize the data label representation model based on the error value. For example, the machine learning model may learn parameters representative of a data label representation model which processes the data label to generate the data label representation having a fixed size (e.g., 256 dimensions) most responsive to the error value.

Training a machine learning model according to the example first aspect may provide a machine learning model that is able to predict data labels that are not present within the training data. For example, the machine learning model may be able to predict an image label "road" for an image containing a road where the training corpus only included instances of the work "street." For example, the machine learning model may be able to predict a company ID "Sprint™", not present in the training data, for a specific user based on a user attempting to pay a new bill on a day which typically coincides with a previous payment to a separate wireless service provider.

Training a machine learning model according to the example first aspect may provide a trained machine learning model that is able to more accurately predict data labels associated with data objects based on training data sets having fewer data object-data label pairs.

Training a machine learning model according to the example first aspect may provide a trained machine learning model that is able to predict a user represented by user data based on the first data set. For example, the trained machine learning model may receive a plurality of first data objects and associated first data labels, and determine a most likely user data based on the received images and labels. This trained machine learning model can be stored on non-transitory computer readable media as a set of data objects stored in a data structure, which, for example, can be deployed for usage in generating machine learning outputs.

While embodiments herein are experimentally validated in respect of computer image analysis, in particular, those adapted for predicting image tags (e.g., hash tags, metadata tags), it is important to note that some of the approaches described herein are useful in relation to learning user representations for open vocabulary data sets, and are not limited to image analysis (e.g., hashtag prediction).

According to example embodiments, a trained machine learning model may be used to proactively label existing data objects within an organization. For example, the machine learning model may be configured to apply titles (e.g., labels) to poorly titled data objects (e.g., emails) within an organization based on user tendencies.

According to some example embodiments, a trained machine learning model may be used to label existing data objects such as invoice images within an organization. For example, an invoice image may be misplaced, or related to an extra, or related to a change order, and a machine learning model trained in accordance with the disclosure may be configured to capture mislabeled items or generate items for the invoice image.

According to some example embodiments, a trained machine learning model may be used to label existing merchandise images for retrieval. For example, merchandise images of prior merchandising campaigns may be more effectively catalogued with the machine learning model for later retrieval.

According to some example embodiments, a trained machine learning model may be used to label damage images received in relation to an insurance claim. For example, damage images may be classified by the machine learning model, which can be used to review claims processes and determine employees who incorrectly refuse claims.

Some approaches, set out below, are designed for fixed data label values and are not extensible as they learn an embedding for each vocabulary element and cannot deal with new vocabulary elements without retraining of the model. Some approaches, set out below, are designed for user values and are not extensible as they learn an embedding for each user, and cannot deal with new users without retraining the model.

Image Tagging With User Representation

Modelling the user is important to exploit images annotated with hashtags because of the self-expression problem. Some approaches introduced a user representation that exploits user data (age, gender, GPS coordinates and country). These user representations may be able to deal with the geographical domain shift (the same semantic category of objects can look quite different on images taken in different geographical locations), but cannot fully represent a user because these user metadata are not informative enough to catch the user behaviour to assign data labels.

Another limitation of the recent works is that it is not always possible to have access to user metadata. To overcome this problem, a proposed approach learned an embedding for each user based on the images and the corresponding hashtags. However, learning a per user embedding prevents a model from dealing with new users.

These approaches do not address the problem of hashtag prediction and modelling the user independently and simultaneously.

Conditional Model for Visual Recognition

Some approaches are related to conditional models for visual recognition (e.g., embodiments directed to image data sets). A popular example is the Visual Question Answering (VQA) task where the input image is conditioned by a question. Recently, an approach proposed a model for the personality-captions task by conditioning the input image on the given style and personality traits.

While some approaches use an addition to fuse the visual and the personality representation, a proposed approach according to some example embodiments herein uses a bilinear product as in most of the VQA models to fuse the visual and the user representation.

Some embodiments described herein can be considered related to the Conditional Similarity Networks that learn embeddings differentiated into semantically distinct subspaces to capture different notions of similarities. However Conditional Similarity Networks can only deal with a fixed number of similarities.

Open Vocabulary

Existing image classification models are not suitable for open vocabulary prediction because the classes are fixed before training and the models are designed to predict among those classes for a given image.

One approach introduced a vocabulary-free image tagging model, that uses image search engine to collect images for each tag in the vocabulary, but it cannot deal with new hashtags after training. A strategy to deal with new categories is to use Zero-Shot Learning (ZSL) model. ZSL models are learned on some categories and tested on others categories based on the knowledge extracted during training.

A more realistic scenario is the Generalized Zero-Shot Learning (GZSL) where both seen and unseen classes are present at test time. A lot of ZSL/GZSL models learn an embedding between a visual space and a semantic space (attributes, text description).

Unlike these works that learn text representation, the proposed machine learning model of some embodiments directly exploits pretrained word representations (e.g., GloVe) to learn the joint embedding space.

Multi-Modal Embeddings

Over the last few years, a lot of models using visual-text embeddings have been proposed for several applications. Today, most of the methods that build cross-modal embeddings between text and images use a triplet loss.

While the original triplet loss averages over all triplets in the mini-batch, one approach introduced a hard negative sampling because the average strategy can lead to vanishing gradients as the optimization progresses, as most of the triplets tend to contribute less to the error. Some approaches observe a significant improvement by using hard negatives in the loss.

However, the hard negative triplet loss is sensitive to noise/outliers and needs a few epochs to "warm up" at the beginning of the learning process because a very limited amount of triplets contribute to a gradient used to adjust parameters, when many are violating the constraints.

Recently, an approach was introduced that utilized an adaptive strategy that automatically adapts the number of triplets used in the loss. These triplet losses work well for tasks like caption retrieval because the number of triplets is the size of the mini-batch. These triplet losses are not scalable for large vocabularies, such as an open-ended machine learning model for predicting labels because the hashtag vocabulary is too large (>400 k).

The complexity in implementing triplet losses is exacerbated for multi-label applications because each example can be a positive example for several hashtags. Approaches show that randomly sampling some triplets is not interesting because most of the triplets incur no loss and therefore do not improve the model. Moreover it is difficult to define negative examples because hashtags have synonyms.

According to some example embodiments, a machine learning model trained according to the example first aspect can process a new first data object and predict a data label that was not present in the training data. For example, the machine learning model trained according to the example first aspect may process a new image and generate a hashtag data label that was not present in the training data.

According to some example embodiments, a machine learning model trained according to the example first aspect can process a new user data set, which may comprise data associated with an existing user, or may comprise data associated with a user unseen during training.

In example embodiments, the trained machine learning model can be used to label one or more new unlabelled user data objects based on a received new user data set which includes one or more new user data objects associated with one or more new user data labels.

The trained machine learning model may process the new user data set, and for each new data object in the new data set, process the respective new user data object and the one or more new user data labels associated with the respective new user data object with the user representation model. For each successive new data object—new data label pair, the trained machine learning model may update a new user representation model output. For example, a first new object-label pair (e.g., date payee was added—payee ID pair) may be processed by the user representation model (which has already been trained). Each subsequent new object-label pair processed by the user representation generates a new user representation output. Each sequential new user representation output can be increasingly accurate for the user associated with the new data set as a result of the trained plurality of parameters for capturing sequential relationships within the user representation model.

The trained machine learning model may continue to process each new user object associated with a particular user, and update the user representation model output. The final user representation output generated from the new data set may be stored in a computer memory. Alternatively stated, the user representation model may discard every user representation model output from non-final data objects.

In example embodiments, multiple unlabelled data objects are processed with the machine learning model based on a single updated (i.e., final) new user representation model output. In example embodiments, the updated user representation model output retrieved from a storage is continually updated with new object-label pairs on a per user basis. For example, where a new data set includes first data object associated with a new user, the updated user representation model output for that user (e.g., user ID 123) is stored. Subsequent new data with data object-data label pairs for the same user (e.g., user ID 123) are used to update the updated user representation model output, and subsequent unlabelled data objects may be processed with the latest updated user representation model output.

Predicting a data label for the unlabelled data object, using the trained machine learning model, may further comprise generating an unlabelled data object representation of the new unlabelled user data object, and fusing the unlabelled data object representation and the updated new user representation model output (e.g., final user representation output based on the new user data) to generate a new user conditional object representation.

In example embodiments, the output of the trained machine learning model is a series of predicted data labels based on the joint embedding space distance between the predicted data label and existing representations in the joint embedding space. For example, the output of the trained machine learning model may comprise a list of company IDs for a user to add once the user attempts to add a payee to an automated payment system.

The systems described herein are implemented using computing devices having a combination of software and hardware, or embedded firmware. The computing devices are electronic devices that include processors (e.g., hardware computer processors), and computer memory, and operate in conjunction with data storage, which may be local or remote. Software may be affixed in the form of machine-interpretable instructions stored on non-transitory computer readable media, which cause a processor to perform steps of a method upon execution.

In some embodiments, the computing devices are specially adapted special purpose machines, such as rack server appliances, that are configured to be installed within data centers and adapted for interconnection with back-end data sources for generating and/or maintaining one or more data structures representing the machine learning architectures associated with one or more corresponding user profiles. The special purpose machines, for example, may have high performance computing components and operate as computing super-nodes to more efficiently generate and/or maintain the user profiles.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

In an embodiment there is provided a computer implemented method for training a machine learning model for predicting data labels, the machine learning model having a plurality of parameters.

The method includes: receiving a first data set comprising one or more first data objects associated with one or more first data labels, each of the one or more first data objects associated with at least one unique user data; training the machine learning model, the machine learning model comprising a user representation model, for predicting data labels by: for each unique user data: processing, with the user representation model, the one or more first data objects and associated one or more first data labels associated with the respective unique user data to generate a user representation model output to fuse the one or more first data objects and the respective associated one or more first data label pairs associated with the respective unique user data; for each first data object associated with the respective unique user data: generating a first data object representation of the respective first data object; fusing the first data object representation and the user representation model output to generate a user conditional object representation; generating a joint embedding space for comparing projections of the user conditional object representation and the respective one or more first data labels associated with the respective first data object; updating the plurality of parameters based on an error value, the error value based on a maximum similarity of the projections of the respective user conditional object representation and the respective one or more first data labels in the joint embedding space; and storing the trained machine learning model for predicting data labels.

In another aspect, fusing the one or more first data objects and associated one or more first data labels associated with the respective unique user data comprises: for each first data object associated with the respective unique user data: generating a second data object representation of the respective first data object; generating a first data label representation for a sum of the one or more first data labels associated with the respective first data object; and fusing the second data object representation and the first data label representation.

In another aspect, fusing the one or more first data objects and associated one or more first data labels associated with the respective unique user data further comprises processing the fused second data object representation and first data label representation with a gated recurrent unit (GRU) to incorporate relational data between fused second data object representation and first data label representations.

In another aspect, generating the second data object representation of the respective first data object comprises passing the respective first data object through a data object representation model using the relation:

$$x_t^{im} = f^{im}(\mathcal{I}_t)$$

where $x_t^{im}$ denotes the second data object representation, $\mathcal{I}_t$ denotes the respective first data object, and $f^{im}$ denotes the data object representation model.

In another aspect, generating the first data label representation for the respective first data object comprises passing the one or more first data labels associated with the respective first data object through a data label representation model function using the relation:

$$x_t^{tag} = f^{tag}(y_t)$$

where $x_t^{tag}$ denotes the first data label representation, $y_t$ denotes a sum of the one or more first data labels associated with the respective first data object, and $f^{tag}$ denotes the data label representation model.

In another aspect, fusing the second data object representation and the first data label representation is based processing the second data object representation and the first data label representation through a fusion function using the relation:

$$x_t = \text{fusion}(x_t^{im}, x_t^{tag})$$

where $x_t^{tag}$ denotes the first data object label representation, $x_t^{im}$ denotes the second data object representation, fusion denotes the fusion function, $x_t$ denotes the fused second data object representation and first data label representation.

In another aspect, fusing the respective first data object representation and user representation model output to generate the user conditional object representation further comprises: processing the respective first data object representation and user representation model output with a bilinear operator using the relation:

$$z_j = v^T W_j u + b_j, j \in \{1, \ldots, d_c\}$$

where the bilinear operator comprises a learned weight matrix $W_j \in \mathbb{R}^{d_v \times d_u}$, a learned bias of the j-th dimension, $b_j \in \mathbb{R}$, v denotes the first data object representation, u denotes the user representation model output, and where $z = [z_j]_{j=1,\ldots,d_c}$ denotes the user conditional object representation.

In another aspect, fusing the respective first data object representation and user representation model output to generate the user conditional object representation further comprises processing the respective first data object representation and user representation model output with a Multimodal Tucker Fusion (MUTAN) model for approximating bilinear operators to generate the user conditional object representation.

In another aspect, the error value is based on a posterior data object label probability established using the relation:

$$p(\hat{y}|\mathcal{I}, u; \Theta) = \frac{f(\mathcal{I}, u, \hat{y}; \Theta)}{\sum_{y \in \mathcal{H}^{train}} f(\mathcal{I}, u, y; \Theta)}.$$

where '$(\hat{y}_n^{(u)} | \mathcal{I}, u; \Theta)$ is the posterior data object label probability for a first user conditional object representation class, $f(\mathcal{I}, u, \hat{y}; \Theta)$ is a probability of the respective user conditional object representation in the joint embedding space being within the first user conditional object representation class, and $\sum_{y \in \mathcal{H}^{train}} f(\mathcal{I}, u, \hat{y}; \Theta)$ is an aggregate probability of the user conditional object representation in the joint embedding space being other than the first user conditional object representation class.

In another aspect, the error value is established using the relation:

$$\mathcal{L}(\Theta) = -\frac{1}{U} \sum_{u \in \mathcal{U}} \frac{1}{N_u} \sum_{n=1}^{N_u} \log p(\hat{y}_n^{(u)} | \mathcal{I}, u; \Theta)$$

where $\hat{y}_n^{(u)}$ is a sampled reference data label for delineating data label classes, $$\frac{1}{N_u} \sum_{n=1}^{N_u}$$

denotes a first normalization with respect to each first data object associated with each unique user, and $$-\frac{1}{U} \sum_{u \in \mathcal{U}}$$

denotes a second normalization with respect to user data.

In another aspect, the joint embedding space is generated using a similarity function using the relation:

$$f(v,u,y;\Theta)=\phi^{iu}(g(v,u))^T\phi^{tag}(\psi(y))$$

where g(v; u) denotes the user conditional object representation, theta is the plurality of parameters of the machine learning model, phi(iu) denotes a first mapping function for mapping user conditional object representation to the joint embedding space, and phi(tag) denotes a second mapping function for mapping the respective first label to the joint embedding space.

In another aspect, the user representation model output is a fixed-size vector.

In another aspect, fusing the data object representation and the data label representation outputs a fixed-size vector.

In another aspect, the machine learning model is trained using iterative batches of the first data set, each batch comprising every one or more first data object and every associated one or more first data labels associated with one unique user data.

In another aspect, generating a data object representation of the respective first data object comprises processing the respective first data object through a convolutional neural network.

In another aspect, the error value is determined based on a triplet loss average for comparing respective user conditional object representation to the first data label associated with the first data object associated with the respective unique user data, and an incorrect first data label.

In another aspect, the joint embedding space is a continuous semantic embedding space.

In another aspect, the one or more first data objects comprises images and the one or more first data labels comprises hashtags.

In another aspect, generating a first data label representation comprises processing each first data label associated with the respective first data object through a pretrained word representation model for open ended vocabulary representation.

In another aspect, generating the first data label representation comprises aggregating each first data label processed through the pretrained word representation model associated with the respective first data object.

In another aspect, generating a joint embedding space comprises: processing the respective one or more first data labels associated with the respective first data object through a pretrained word representation model; and comparing projections of the user conditional object representation and the respective one or more first data labels processed through the pretrained word representation model and associated with the respective first data object.

In another aspect, the joint embedding space is representative of an open vocabulary space.

In another aspect, the GRU processes fused second data object representation and first data label representation using the relation:

$$h_t = f_{GRU}(x_t, h_{t-1})$$

where $h_t$ is the hidden state of the GRU at step t and $h_0=0$., and $x_t$ denotes the fused second data object representation and first data label representation.

In another aspect, a method of predicting data labels for new user data with a machine learning model trained according to the disclosure comprises: receiving a new user data set comprising: one or more new user data objects having associated one or more new user data labels; and one or more new unlabelled user data objects; processing the new user data set with the machine learning model, comprising: processing the one or more new user data objects and associated one or more new user data labels with the user representation model generating a new user representation model output; generating a new data object representation of the respective new user data object; fusing the new data object representation and the new user representation model output to generate a new user conditional object representation; and classifying the new user conditional object representation.

In another aspect, the new user data set is associated with an existing unique user data.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 8 is an example computing system, according to some embodiments.

DETAILED DESCRIPTION

Systems and methods adapted for training a machine learning model are described herein in various embodiments. As described further, learning user representations for predicting data labels for data objects presents challenging technical problems because the user representation should encode not only some information about the user, for instance likelihoods to assign data labels to specific data objects, but also the correlations between the data labels and the data objects themselves.

Prior approaches proposed to learn an embedding for each user, however the are not extensible as embedding per user prevents the machine learning model from dealing with new users.

While embodiments herein are experimentally validated in respect of computer image analysis, in particular, those adapted for predicting image tags (e.g., hash tags, metadata tags), it is important to note that the approaches are useful in relation to learning user representations for open vocabulary data sets, and are not limited to image analysis (e.g., hashtag prediction).

Figure 1A:
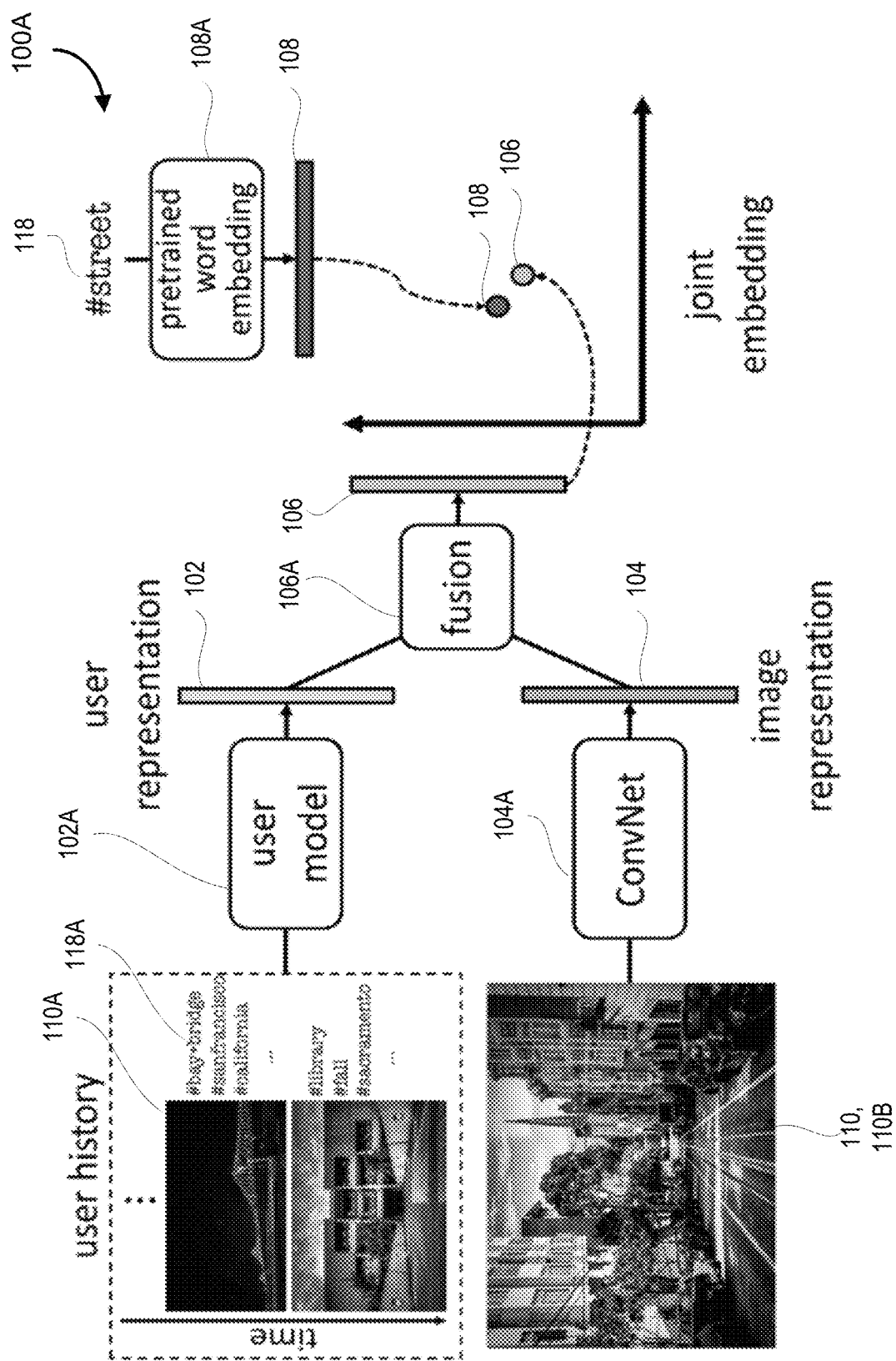
FIG. 1A is a block schematic of an example proposed machine learning model, according to some embodiments.

Applicants have proposed a new model that extracts a representation of a user from the first data set (user labelling history, or a hashtag history in this non-limiting example, shown in the left section of FIG. 1A).

FIG. 1A is a block schematic of an example proposed machine learning model 100A, according to some embodiments.

The proposed machine learning model 100A may generate; a user representation model output 102 (via a user representation model 102A), a data object representation 104 (via a data object representation model 104A), a user conditional object representation 106 (via a fusion model 106A), and a data label representation 108 (via the data label representation model 108A), based on one or more data objects 110 (in the non-limiting example shown, images), and associated data labels 118 (in the non-limiting example shown, hashtags).

The machine learning models 100A, (and 100B shown in FIG. 1B) has a plurality of parameters representative of a plurality of nodes in a plurality of layers, the plurality of nodes configured to generate, and, in example embodiments, communicate values based on the plurality of parameters to subsequent nodes. The plurality of parameters may be learned in the course of training the machine learning model 100A.

The user representation model 102A may process the one or one or more first data objects 110A and the associated one or more data labels 118A in order to generate the user representation model output 102. The user representation model 102A may fuse a vector data object representation 104 and data label representation 108 to generate the user representation model output 102. For example, the user representation model 102A may generate a vector, the user representation model output 102, of each object-label pair in the first data objects 110A and the associated one or more data labels 118A. The user representation model 102A is defined by the plurality of parameters, and may be learned in the course of training the machine learning model 100A.

In example embodiments, the user representation model output 102 is a fixed-length vector capable of being processed by the fusion model 106A. The fixed-length of the user representation model output 102 may be configured based on the nature and type of data objects and data labels being processed. For example, the length of the vector may be configured based on available computing resources, the quantity of data of the data objects (e.g., resolution in the image example), and the type of data objects (e.g., image objects vs text objects).

The data object representation model 104A may, similar to the user representation model 102A, process one or more first data objects 110A in order to generate the first data object representation 104. The data object representation model 104A may utilize various neural networks, including a convolutional neural network (ConvNet), to generate a vector data object representation. The vector data object representation (e.g., first data object representation 104) may capture interrelations within the data object which are important for the training purpose defined by the error value. The data object representation model 104A is defined by the plurality of parameters, and may be learned in the course of training the machine learning model 100A.

The first data object representation 104 may be a fixed-length vector, and is capable of being processed by the fusion model 106A. The fixed-length of the first data object representation 104 may be configured in a manner similar to the user representation model output 102.

The fusion model 106A may process the first data object representation 104 and the user representation model output 102 in order to generate the user conditional object representation 106. The fusion model 106A may fuse the vector first data object representation 104 and the user representation model output 102 to generate a user conditional object representation 106. In example embodiments, the user conditional object representation 106 is a fixed length vector. The fixed-length of the user conditional object representation 106 may be configured in a manner similar to the user representation model output 102. The fusion model 106A is defined by the plurality of parameters, and may be learned in the course of training the machine learning model 100A.

The data label representation model 108A may process the first data label 118 (e.g., company ID) and generate data label representations 108. In example embodiments, the data label representation model 108A is a pre-trained word embedding model, which incorporates information not within the training data (e.g., first data set) to share information between data labels so that the knowledge learned from data labels observed during training (i.e., seen labels) can be transferred to data labels not observed during training (i.e., unseen labels). For example, data label representation model 108A can encode, with a pre-trained embedding, the first data label, being a company ID, with reference to a data set of exiting company IDs. Pre-trained embeddings may be beneficial when applied to imbalanced data, such as company IDs and hashtags, and the exact nature of the pre-trained embedding may be learned in the course of training the machine learning model 100A.

Training the machine learning model comprises 100A processing each data object 110-data label 118 pair with the user representation model 102A to generate the user representation model output 102. In addition to generating the user representation model output 102, training the machine learning model 100A may further comprise, for each first data object associated with the respective unique user data, generating the first data object representation 104 of the respective first data object 110 by processing the respective first data object 110 with the data object representation model 104A.

Training the machine learning model 100A further comprises fusing the first data object representation 104 and the user representation model output 102 to generate the user conditional object representation 106 via the fusion model 106A. The fusion model may be based on a bilinear operator or a Multimodal Tucker Fusion (MUTAN) model.

Training the machine learning model 100A may further comprise generating a joint embedding space for comparing projections of the user conditional object representation 106 and the respective one or more first data labels 118 associated with the respective first data object 110. According to example embodiments, the joint embedding space is generated by projecting the user conditional object representation 106 in accordance with a first mapping function (not shown). The first mapping function is defined by a plurality of parameters, which are embedded within the machine learning model, and may be learned in the course of training the machine learning model 100A. The joint embedding space is further generated by projecting the respective one or more first data label representations 108 associated with the respective first data object 110 with a second mapping function (not shown). The second mapping function is defined, similar to the first function, by the plurality of parameters incorporated into the machine learning model 100A, and may be learned in the course of training the machine learning model 100A.

The first mapping function and the second mapping function outputs may be used to define a joint similarity function (not shown) for representing the similarity of the first mapping function and the second mapping function outputs in the joint embedding space. According to some embodiments, for example, the joint similarity function can be the inner product of the first mapping function and the second mapping function outputs.

In order to train the machine learning model 100A, the joint embedding space can be used to train the machine learning model 100A to maximize the similarity between the user conditional image representation 106 projection in the joint embedding space and the associated first data label representation 108 projections in the joint embedding space.

According to example embodiments, training the machine learning model 100A comprises updating the plurality of parameters based on an error value, the error value based on a maximum similarity of the projections of the respective user conditional object representation 106 and the respective first data label representation 108 projections in the joint embedding space.

In example embodiments, the error value is based on a triplet loss value which comprises comparing respective user conditional object representation 106 to a correct first data label 118 and an incorrect first data label (not shown). The distance, in the joint embedding space, from the user conditional object representation 106 to the correct first data label representation 118 is minimized, and the distance from the user conditional object representation 106 projecting to the incorrect first data label projection is maximized.

After training, the trained machine learning model 100A may process new data sets, shown in the example embodiment as new data object 110A and new data label 118A. The trained machine learning model 100A can be used to predict a data label for an unlabelled data object 1108 based on the new data object 110A and new data label 118A.

Processing new data sets comprises processing the new data objects 110A and the new data labels 118A associated with a particular user, sequentially, through the trained user representation model 102A. The final user representation model output 102 generated based on the last new data object sequentially provided to the user representation model 102A is stored as a new user representation model output 102.

Processing new data sets comprises processing the unlabelled data object 1108 through the data representation model 104A to generate the first data object representation 104. The data object representation 104 and the new user representation model output 102 (based on the new data set) are fused by the fusion model 106A to generate a new user conditional object representation 106.

In example embodiments, the fused one or more first data objects 110 and the respective associated one or more first data labels 118 (alternatively referred to as the "fused user representation") is a fixed length vector.

Processing new data sets may comprise processing the new user representation model output 102 with a plurality of parameters for capturing sequential relationships within data to store interrelationships between sequential fused new user representation model outputs 102. In example embodiments, any of the constitute elements within the process of generating the user representation model output 102 are passed through the plurality of parameters for capturing sequential relationships within data. For example, the fused second data object representation and first data label representation may be passed through the plurality of parameters for capturing sequential relationships within data.

In example embodiments, the plurality of parameters for capturing sequential relationships within data to store interrelationships is representative of a gated recurrent unit (GRU) 130. In example embodiments, the fused user representation is processed through successive GRUs (not shown) within the user representation model 102A.

Processing new data sets further comprises projecting the user conditional object representation 106 into the joint embedding space learned during training the machine learning model 100A, and predicting a new determined data label based on a nearest data label representation 108 in the joint embedding space associated with the new user conditional object representation 106. For example, the projected user conditional object representation 106 may be nearest to a data label representation 108 projection in the joint embedding space indicative of a company ID for a wireless service provider, and the trained machine learning model 100A may output the company ID for the wireless service provider.

According to example embodiments, the determined data label is based on determining whether the user representation model output 102 is within a particular range in the learned joint embedding space of a particular data label representation 108 projection. For example, the trained machine learning model 100A may not output a company ID data label that is associated with the particular data label representation 108 if it is outside an acceptable range.

Processing a representation or output with the machine learning model 100A, or any constituent plurality of parameters incorporated within the machine learning model 100A, for example, processing with the user representation model 102A, refers to a process whereby data or a subset of data are used as inputs for the plurality of nodes which plurality of nodes are in a plurality of layers. The nodes are arranged in sequence, and are interconnected such that one node may pass a value to a subsequent node, whether within the same layer or otherwise, within the machine learning model. In example embodiments, a single node may pass a value to multiple subsequent nodes within the machine learning model 100A.

The plurality of nodes are associated with the plurality of parameters for determining which value, if any, is communicated to successive node(s) of the machine learning model 100A.

Training the machine learning model 100A comprises adjusting the plurality of parameters based on an error value generated by the machine learning model that results from comparing a final value output by a final layer(s) of nodes of the machine learning model to a reference truth. For example, a machine learning model may output a value which is indicative of an image being a cat. The image may be labelled as indicative of a dog. Training the machine learning model may comprise adjusting the parameters, via a loss function, such that the final value output by a final layer(s) of nodes of the machine learning model more consistently, or more accurately, approximate the reference value.

Referring again to FIG. 1, in an alternate embodiment, in place of company IDs or hashtags, the first data set may include metadata or tags/labels associated with characteristics of businesses (e.g., boutique coffee shop located in Detroit), and the predicted data labels could be a label estimating an interest score for a user, for example, based on transaction data (e.g., data objects).

Figure 1B:
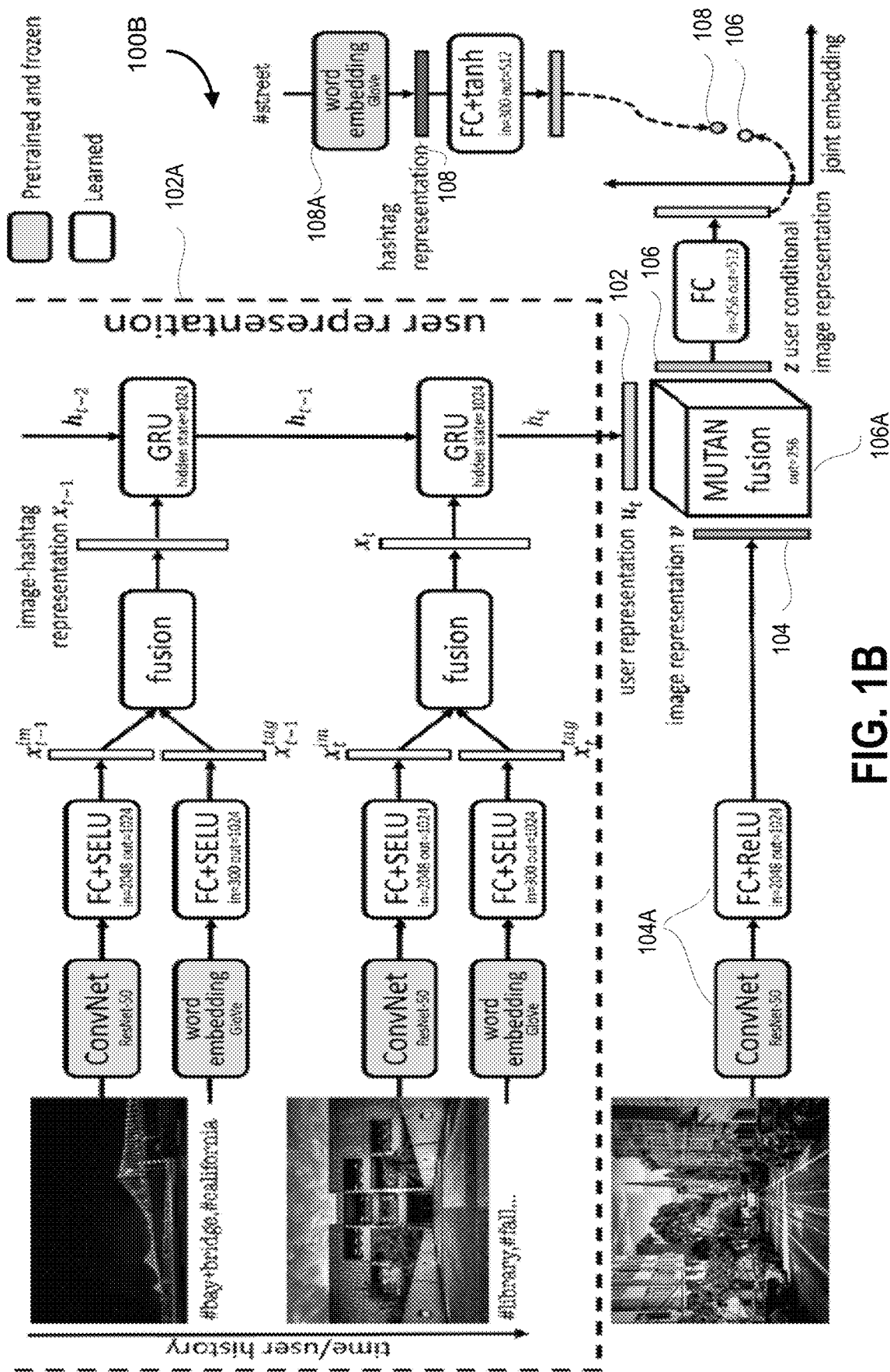
FIG. 1B is a block schematic of an example machine learning model having to a first example configuration, according to some embodiments.

FIG. 1B is an illustration of block schematic of an example machine learning model 100B having a first example configuration. Similar to FIG. 1A, the machine learning model 100B comprises a data object representation model 104A, a fusion model 106A, and a user representation model 102A.

In FIG. 1B, the data object representation model 104A comprises a convolutional neural network (shown as a ConvNet), and a fully connected layer (FC) layer which utilizes a rectified linear unit (ReLu) for activation. The rectified linear unit activation can avoid non-zero values in the vector representing the first data object 110 passed through the data object representation model 104A. The convolutional neural network of the data object representation model 104A is shown as being pretrained. In the shown embodiment, the convolutional neural network of the data object representation model 104A is the ResNet-50 model, outputting a 50 dimensional vector.

In the example embodiment shown, the MUTAN fusion model 106A outputs a fixed length vector output of 256 user dimensionality.

Figure 1C:
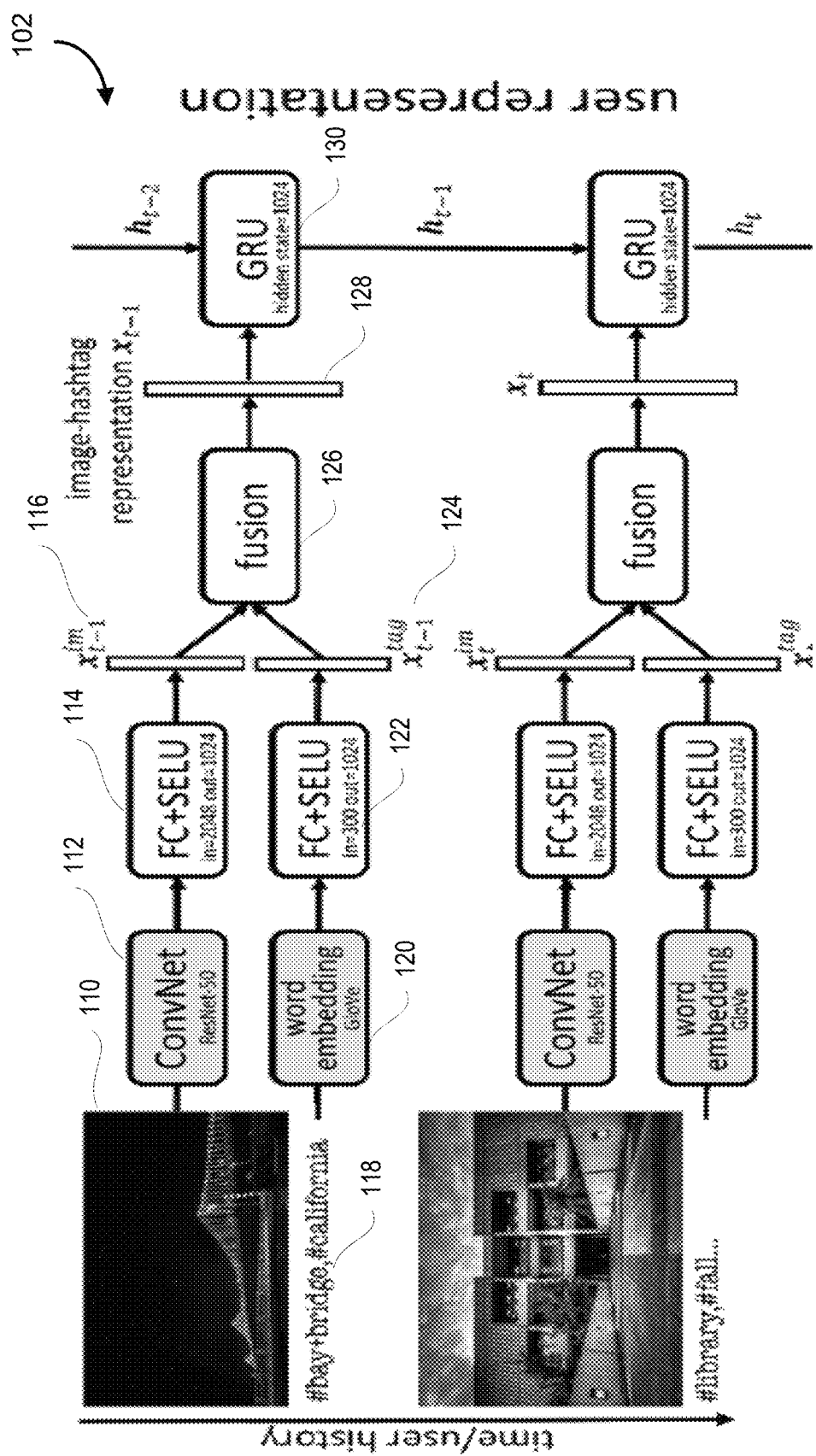
FIG. 1C is a block schematic of an example user representation model, according to some embodiments.

FIG. 1C shows the user representation model 102A. In the example embodiment shown, the user representation model 102A processes the first data object 110 using a convolutional network 112 (e.g., the ResNet-50 model), similar to the data object representation model 104A. In example embodiments, the same convolutional network is used to process first data objects 110 for both the user representation model 102A and the data object representation model 104A.

Processing the first data object 110 with the user representation model 102A may comprise communicating the output of the data object representation model 104A with a subsequent fully connected (FC) layer 114 which utilizes a Scaled Exponential Linear Unit (SeLu) for activation.

The output resultant from the processing the first data object 110 through the convolutional network 112 and the fully connected layer 114 is the second data object representation 116.

In example embodiments, processing the first data label 118 with the user representation model 102A comprises passing the first data label 118 through a word embedding model 120 and subsequently through the fully connected layer 122 (similar to the fully connected layer 114). The resultant output can be the first data label representation 124. In the shown embodiment, the fully connected layer 122 increases the dimensionality of the first data label 118 processed with the word embedding model 120.

Processing the first data set with the user representation model 102A further comprises fusing the first data label representation 124 and the second data object representation 116 via a fusion model 126. Fusing, via the fusion model 126, the first data label representation 124 and the second data object representation 116 may create a vector 128 representative of user tendencies for assigning a data label to a data object based on the processed.

In some embodiments, for example, the vector 128 may be processed by the GRU 130. The GRU 130 is capable of alleviating the vanishing gradient problem of a standard recurrent neural network, and comprises an update gate and a reset gate. The update date decides what information should be retained by the GRU 130, and the update gate determines when the retained information within the GRU 130 should be reset. According to example embodiments, the GRU 130 may process the vector 128 and output a fixed length vector.

Any one of the user representation model 102A, data object representation model 104A, fusion model 106A, and the data label representation model 108A may be a non-linear function.

According to some embodiments, the convolutional network 112 and the word embedding model 120 are domain specific, and can be modified or replaced as different domains are utilized for the first and second data sets. For example, the domain specific components of FIG. 1B, directed to image processing and hashtag processing, respectively, can be replaced with application specific components unrelated to image processing.

In the experimental analysis, Applicants seek a machine learning model capable of outputting open vocabulary prediction, i.e., the machine learning model 100A not being limited to a fixed set of vocabulary elements.

A vocabulary can be established as a lexicon having a body of elements used in a particular representation, such as the body of words used in a particular language, the body of hashtags used to label images, etc. An open vocabulary is one whose elements are not fully defined and evolve over time, such as a dictionary of words in the English language, which evolves as new words are added to the dictionary (or reduced or modified as obsolete words are pruned).

As described herein, an open vocabulary for machine learning causes technical challenges as new approaches are required for improved training to address the potential evolution of the elements within the vocabulary. A vocabulary can be represented as a set of features, and may be stored in data storage in data representations, such as an array of strings, a linked list, a database object (e.g., each string having a separate row), among others, and each element may be associated with various characteristics.

The machine learning model 100A, of some embodiments, uses pretrained embedding models (e.g., word embedding model 120) to represent each first data label 118, (e.g., hashtag) in a continuous and semantic space. When the data label representation (e.g., second data label representation 108) is projected into a joint embedding space with the user conditional object representation 106, the joint embedding space may allow for a continuous and semantic space which can be used to predict an open ended set of data labels. For example, as a vocabulary evolves over time, the new vocabulary can be mapped into the joint embedding space. When the machine learning model 100A predicts new data labels with user conditional object representation 106 projections, the nearest data label in the joint embedding space may be a new data label from an updated set of data label representations 108.

Continuous semantic embedding space is more appropriate that using separate classifiers because the first data labels 118 (e.g., hashtags) could have synonyms. Continuous semantic embedding space also allows the approach to deal with the long tail distribution problem, where certain data labels occur with low frequency, and unseen data labels, it a continuous semantic embedding space can share information between first data labels (e.g., hashtags). Experimentally, Applicants show that the machine learning model 100A is scalable and can deal with more than 550K unique hashtags in an example implementation.

The approach can be used bi-directionally between the first data objects 110 and the first data labels 118 (e.g., for both image-to-hashtag and hashtag-to-image retrieval), and can be extendable to new data sets (e.g., new hashtags).

The trained machine learning model 100A may extract a user representation from a first data set (e.g., payee adding history), allowing the trained machine learning model 100A to process data associated with new users. In example embodiments, the trained machine learning model 100A can improve a user representation (i.e., the user representation model output 102) with new data objects. For example, new data object—data label pairs provided to the trained machine learning model 100A can improve the user representation, by sequentially processing the new data object—data label pairs and storing a latest user representation model output 102 generated by the trained machine learning model 100A.

Figure 2:
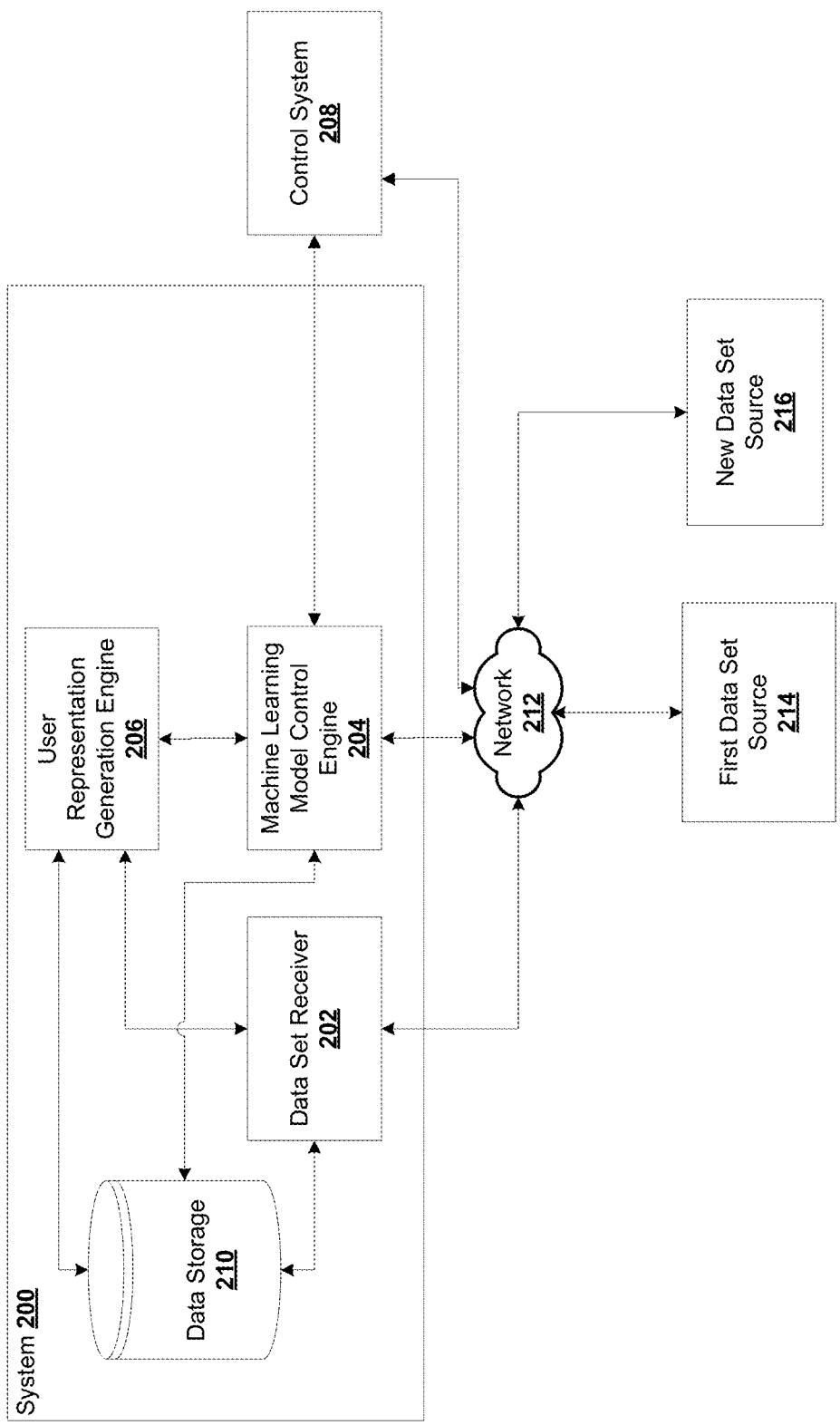
FIG. 2 is a block schematic of an example system, according to some embodiments.

FIG. 2 is a block schematic diagram of an example system 200, according to some embodiments. The systems are implemented using computing devices having a combination of software and hardware, or embedded firmware.

The computer implemented system 200 is shown, and is configured for learning one or more user representations. The system 200 includes a data set receiver 202, a machine learning model control engine 204, and a user representation generation engine 206. Each of these components are implemented using electronic circuitry, which may be controlled using software and/or embedded firmware. The system 200 may store any data, such as the first data set, or the trained machine learning model, on the data storage 210.

The data set receiver 202 is configured to receive the first data set associated with a user data.

The machine learning model control engine 204 is configured to maintain machine learning models (e.g., machine learning model 100B) which are adapted to output one or more probability distributions corresponding to first data labels.

The user representation generation engine 206 is configured to perform the functions of the user representation model 102A. In example embodiments, the user representation engine 206 is operated by a computer processor separate to the computer processor responsible for the machine learning model control engine 204.

The prediction generated by the machine learning model control engine 204 may be encapsulated in the form of a data element or a data structure, which can be provided to downstream systems, such as various control systems 208 which are adapted to modify one or more downstream data processes responsive to the prediction information. For example, a user device (not shown) may be configured to display a predicted payee ID in response to a user attempting to add a payee to an automated payment system based on the prediction generated by the machine learning model control engine 204.

In example embodiments, the system 200 may receive the first data set from the first data set source 214, external to the system, via network 212. Similarly, the system 200 may receive new data sets from a new data set source external to the system 200. According to example embodiments, the new data set source 216 is the same as the first data set source 214, or the two sources are in communication with one another.

Network 212 (or multiple networks) is capable of carrying data and can involve wired connections, wireless connections, or a combination thereof. Network 212 may involve different network communication technologies, standards and protocols, for example.

In an embodiment, experimentation shows that an image history can be used to extract a good user representation. Applicants investigate the efficacy of the user representation for both user-specific image tagging and user retrieval, the results of which may be applicable to other types of first and second data sets.

Applicants also evaluate the ability of the machine learning model 100A to generalise and predict data labels unseen during training, for example, hashtag prediction with a large and open vocabulary.

Machine Learning Model

An objective of the proposed machine learning model 100A is to learn a user-specific prediction model (e.g., user-specific hashtag prediction model). The machine learning model 100A uses the first data set (e.g., user image history) to compute the user representation model output 102 and hence it can deal with new users. Applicants first present the user conditional joint embedding model for open vocabulary (e.g., hashtag) prediction and then the model to extract a user representation from a user's image history.

Notations.

Applicants note a set of U users $\mathcal{U} = \{u_1, \ldots, u_U\}$ and a vocabulary of $K$ hashtags $\mathcal{H} = \{h_1, \ldots, h_K\}$.

In the fixed vocabulary setting, the vocabulary of hashtags is the same for training and testing, i.e., $\mathcal{H}^{train} = \mathcal{H}^{test} = \mathcal{H}$, whereas for the open vocabulary setting, the vocabulary of hashtags for training is a subset of the vocabulary of hashtags for testing, i.e., $\mathcal{H}^{train} \subset \mathcal{H}^{test} = \mathcal{H}$.

For each user $\mathcal{U}$, Applicants have access to an ordered list by time of $N_u$ images with their associated hashtags: $\mathcal{I}^{(u)} = [(\mathcal{I}_1^{(u)}, \mathcal{H}_1^{(u)}), \ldots, (\mathcal{I}_{N_u}^{(u)}, \mathcal{H}_{N_u}^{(u)})]$, where $\mathcal{I}_j^{(u)}$ is the image and $\mathcal{H}_j^{(u)} \subset \mathcal{H}$ is the subset of hashtags of the j-th image.

Each image is associated with a unique user, and with one or more hashtags. Applicants use separate set of users for training and testing.

User Conditional Joint Embedding Model

Applicants define the problem as an automatic image labelling based on inferring hashtags, conditioned on an image $\mathcal{I}$, and a user u.

During training, Applicants aim at learning a model $f$ that outputs the probability distribution over a tag $y_i$ conditional on the image $\mathcal{I}$ and the user u:

$$p(y_i = 1 | \mathcal{I}, u; \Theta) = f(\mathcal{I}, u, y_i; \Theta) \tag{1}$$

where $\Theta$ are the whole set of parameters of the model. The architecture of the approach is shown in FIG. 1A. The machine learning model 100A first extracts a representation of the user from, for example, a user image history and a visual representation of the image. Then, these representations are fused to compute a user conditional image representation. Finally, the model learns a joint embedding between the user conditional image representations and the hashtag representations.

User Conditional Image Representation

Applicants now explain how to compute the user conditional image representation. The image $\mathcal{I}$ and user u are firstly embedded into vectors v and u respectively.

Applicants use a ConvNet to extract a fixed-size vector representation $v \in \mathbb{R}^{d_v}$ of the visual content of an image. Applicants explain below how to extract a fixed-size vector representation $u \in \mathbb{R}^{d_u}$ of a user. The image and user representations v and u are then fused using a bilinear operator to produce a user conditional image representation $z \in \mathbb{R}^{d_c}$:

Bilinear models are powerful solutions used in particular in computer vision to capture multimodal interactions [11, 18, 25, 43].

The bilinear model is more expressive than straightforward concatenation, element-wise product, or element-wise sum. A bilinear model is defined as follows:

$$z_j = v^T W_j u + b_j, j \in \{1, \ldots, d_c\} \tag{2}$$

Where $W_j \in \mathbb{R}^{d_v \times d_u}$ is a weight matrix and $b_j \in \mathbb{R}$ is a bias of the j-th dimension. $z = [z_j]_{j=1, \ldots, d_c}$ is the output of the bilinear model and represents the image-user pair. Applicants need to learn the tensor $W = [W_j]_{j=1, \ldots, d_c} \in \mathbb{R}^{d_v \times d_u \times d_c}$ and the bias $b = [b_j]_{j=1, \ldots, d_c} \in \mathbb{R}^{d_c}$.

Joint Embedding

Applicants introduce the joint embedding model that can deal with data labels such as hashtags unseen during training (FIG. 1B).

Applicants first present the data label representation (e.g., hashtags) and then the joint embedding space between the hashtags and the user conditional visual representations.

Hashtag Representation.

Applicants represent each hashtag y with a pretrained word embedding $\psi(y) \in \mathbb{R}^{d_w}$.

If a hashtag is composed of several words, Applicants sum the representation of each word e.g., $\psi$(black+white)=$\psi$(black)+$\psi$(white). If a hashtag does not have word representation, it is possible to approximate it by using some algebraic properties.

Pretrained word embeddings are used as auxiliary information to share information between hashtags so that the knowledge learned from seen hashtags can be transferred to unseen hashtags.

For the same reason, pre-trained embeddings allow the machine learning model 100A to deal with the long-tail distribution problem because it can transfer knowledge from the data-rich head to the data-poor tail hashtags [47]. In the experiments Applicants use GloVe [35], but the machine learning model 100A can work with other word embeddings (e.g., [34, 48, 5]) that encode semantic information.

Note that these word embeddings do not require additional supervision because they are learned in an unsupervised way from large text corpora. Then, the aim is to learn functions that take the representation of an arbitrary hashtag and a user conditional image representation as inputs and embed them into a joint embedding.

Similarity Function.

To learn the joint embedding space, Applicants define a similarity function between the two modalities. Applicants first project each modality in a joint embedding space by learning a mapping function $\phi^{iu}: \mathbb{R}^{d_c} \to \mathbb{R}^d | (\text{resp. } \phi^{tag}: \mathbb{R}^{d_u} \to \mathbb{R}^d)$ from the user conditional image (resp. hashtag) space to the joint embedding space.

Then, Applicants define the similarity function in the joint embedding space to be the usual inner product. Given a user conditional image representation g(v,u) (=z), Applicants compute the compatibility score of any given hashtag y as follows:

$$f(v,u,y;\Theta) = \phi^{iu}(g(v,u))^T \phi^{tag}(\psi(y)) \quad (3)$$

The intuition is to maximize the similarity between the user conditional image representation and its associated hashtags in the joint embedding space.

Unlike standard visual-semantic embeddings, the joint embedding also depends on the user, so an image can be mapped to different points in the joint embedding space with respect to separate user behaviour. Note that unlike existing image hashtag prediction models [11, 43], the number of learnable parameters of the model is independent of the hashtag vocabulary size.

User Representation

A component of the machine learning model 100A is the user representation model because hashtags are inherently subjective and depend of the user.

To extract a representation of a user, Applicants propose to exploit the user's image history.

The proposed machine learning model 100A allows for extracting a user representation of a new user by exploiting only the user's image history without retraining the machine learning model 100A.

Extracting a good user representation is a challenging problem because the user representation should encode some information about the user, for instance the hashtags used (each user only uses a small subset of hashtags based on his topics of interest), his language (English, Spanish, French, etc.), but also the correlations between the images and the hashtags.

Applicants now explain the method to extract a user representation model output 102. Given a user u, Applicants assume that Applicants know his image history (or a subset) $\mathcal{I}^{(u)}$.

Hereinafter, Applicants ignore the notation for the sake of clarity because Applicants only consider one user. To predict the hashtags of the T-th image, Applicants use the T−1 past images and their corresponding hashtags to extract the user representation $u_{1:T-1} \in \mathbb{R}^{d_u}$.

Applicants first extract a representation (i.e., vector 128) for each pair image-hashtags in the user history. Then, Applicants aggregate these representations with the GRU 130 (GRU [9]) to compute the user representation model output 102.

Image-Hashtags Representation.

The goal is to compute a vector representation of each pair image-hashtags.

Applicants first extract a visual representation for each image in the user history with a ConvNet 112:

$$x_t^{im} = f^{im}(\mathcal{I}_{i,t}) \in \mathbb{R}^{d_i} \forall t < T \quad (4)$$

Applicants use a different ConvNet 112 that the data object representation model 104A used to extract the visual representation v because these two networks have different goals (representing an image vs representing a user).

Experimentally, Applicants observe that using separate networks improves the performance of the machine learning model 100A. Similarly, Applicants compute a representation of the hashtags associated with each image (i.e., the data label representation 108). Applicants first extract a word representation for each hashtag (e.g., by processing the first data label 118 with the word embedding model 120) and then Applicants sum each hashtag representation to have a fixed size representation $y_t$, and finally Applicants learn a non-linear mapping function $f^{tag}$:

$$x_t^{tag} = f^{tag}(y_t) \in \mathbb{R}^{d_t}, y_t = \sum_{y \in \mathcal{H}_t} \psi(y) \quad \forall t < T \quad (5)$$

Applicants then aggregate the image and hashtag representation (e.g., via the fusion model 126) to compute a representation for each pair image-hashtags.

$$x_t = \text{fusion}(x_t^{im}, x_t^{tag}) \forall t < T \quad (6)$$

Applicants use an element-wise product to fuse the two modalities. As noted in a further selection, Applicants analyze several fusion operators and Applicants observe that the choice of the fusion model is important in some embodiments.

User Representation.

An objective is to compute a fixed size user representation $u_{1:T-1}$ given a set of features $\{x_t\}_{t=1,\ldots,T-1}$ representing each pair image-hashtags of the user history.

To take into account the temporal information of the images, Applicants use the GRU 130 (or the Gated Recurrent Unit (GRU [9])):

$$h_t = f_{GRU}(x_t, h_{t-1}) \quad \forall t < T \quad (7)$$

Where $h_t$ is the hidden state of the GRU at step t and $h_0=0$. GRUs turn variable length sequences into meaningful, fixed-sized representations. The last hidden state $h_{T-1}$ is used as user representation $u_{1:T-1}$.

To aggregate the image-hashtags representations, it is possible to use other pooling functions (e.g., max, average), but the experiments show that taking into account the temporal information improves the performances.

Learning

The training objective is to increase the similarity of the present hashtags, while decreasing the similarity of the other hashtags.

Because the triplet loss commonly used to learn joint embedding is not scalable, Applicants, in an example embodiment, employ a classification loss for this task. Various approaches [23, 40, 43, 32] suggest that a softmax classification can be very effective even in multi-label settings with large numbers of classes.

Given an user u and an image $\mathcal{I}_{i,n}$, the posterior hashtag probability is:

$$p(\hat{y}|\mathcal{I}, u; \Theta) = \frac{f(\mathcal{I}, u, \hat{y}; \Theta)}{\sum_{y \in \mathcal{H}^{train}} f(\mathcal{I}, u, y; \Theta)} \quad (8)$$

The probability distribution is computed only on the hashtags known during training ($\mathcal{H}^{train}$).

In this example, Applicants select a single hashtag $\hat{y}_n^{(u)}$ uniformly at random from hashtag set $\mathcal{H}_n^{(u)}$ as target class for each image.

All the weights (i.e., parameters) except, due to the limitation of GPU memory, the weights representative of the ResNets (for example ConvNet 112), are optimized jointly in an end-to-end manner by minimizing the negative log-likelihood of the probability distribution:

$$\mathcal{L}(\Theta) = -\frac{1}{U} \sum_{u \in \mathcal{U}} \frac{1}{N_u} \sum_{n=1}^{N_u} \log p(\hat{y}_n^{(u)}|\mathcal{I}, u; \Theta) \quad (9)$$

In example embodiments, due to technical constraints, it may not be possible to have first data objects 110 associated with several users in memory at the same time. As a result, in example embodiments, a mini-batch may contains the consecutive images of a single user.

Experiments

Implementation Details.

Applicants use PyTorch in the experiments and each experiment runs on 1 GPU.

Applicants train the machine learning model 100A using ADAM [26] during 20 epochs with a start learning rate 5e-5. Applicants use the ResNet-50 [21] as ConvNet (e.g., ConvNet 112) and the GloVe embeddings [35] as pretrained-word embeddings (e.g., word embedding model 120). GloVe was trained on Common Crawl dataset with a vocabulary of 1.9 M words.

Despite their appealing modelling power, bilinear models are intractable for the task, because the size of the full tensor is prohibitive.

In the experiments, Applicants use the MUTAN model [4] to approximate the bilinear product (Equation 2) but other models [18, 25, 50, 13] can be used.

Datasets.

Applicants perform experiments on a subset of YFCC100M dataset [41]. YFCC100M dataset consists of about 99 million images from the Flickr image sharing site. Applicants collect the images from all the users having between 100 and 200 images with at least one hashtag.

Applicants use all hashtags for which Applicants can compute a GloVe representation.

The experiment training set has a vocabulary of 442 k hashtags and the test set has a vocabulary of 568 k hashtags (about 125 k hashtags are unseen during training). Applicants ignore all the images that do not have at least one valid hashtag. Finally, Applicants keep all the users that have at least 50 images.

Applicants split the sets by user ID in order to ensure that images from the same user do not occur in both sets. Applicants assign 70% (resp. 10% and 20%) of the images to the training (resp. validation and test) set. Thereafter, this dataset is named open vocabulary dataset. Applicants also proposed a fixed vocabulary version of the open vocabulary dataset. Applicants use a similar hashtag pre-processing that [43] splits dataset by user ID.

The model architecture has small changes to be more similar than [43].

Metrics. To evaluate the machine learning model 100A prediction performance with the hashtag dataset, Applicants use three standard metrics [11, 43]: Accuracy@k (A@k), Precision@k (P@k) and Recall@k (R@k).

Applicants use k=1 and k=10: for instance, A@1 measures how often the top-ranked hashtag is in the ground-truth hashtag set and A@10 how often at least one of the ground-truth hashtags appears in the 10 highest-ranked predictions.

Hashtag Prediction

In this section, Applicants evaluate the machine learning model 100A for a hashtag prediction task where the machine learning model 100A attempts to rank an image ground-truth hashtag as more likely than hashtags not associated with the image. In this experiment, Applicants use all the previous images of a user to compute the user representation.

Baseline Models.

Applicants compare the machine learning model 100A with models comprising the following notable features:

[A] FREQUENCY: this simple baseline model ignores input image and user representation, always ranking hashtags by their frequency in the training data.

[B] USER AGNOSTIC: this model is equivalent to a standard image classification: there is no user representation.

[C] USED HASHTAGS: in this model, the user representation is a binary vector of the hashtags used in previous images by the user:

$$u=[u_1, \ldots, u_K] \text{ where } u_i \in \{0,1\} \quad (10)$$

where $u_i=1$ (resp. $u_i=0$) means that the h hashtag has been used (resp. has never been used) by the user.

[D] HASHTAG OCCURRENCES: in this model, the user representation is similar as [C] expects that it indicates the occurrence number of each hashtag:

$$u=[u_1, \ldots, u_K] \text{ where } u_i \in \mathbb{N} \quad (11)$$

where $u_i$ indicates the number of times that the i-th tag has been used by the user.

[E] HASHTAG SUM: in this model, the user representation is the sum of each hashtag word representation used in previous images by the user.

The models [C] and [D] are not used on the open vocabulary dataset because they require a fixed hashtag vocabulary.

Note that it is not possible to compare with the user representation proposed in [11] because it uses user metadata that are not available in the dataset.

Applicants also report the results of an embodiment of the machine learning model 100A with only the hashtag branch in the user representation model (i.e. $x=x^{tag}$) and without the pretrained GloVe embeddings (they can be randomly initialised).

Results.

The performance of the models [A], [B], [C], [D], [E], and the machine learning model 100A is compared based on the data set further described in Table 7 and the below metrics of performance.

Metrics

The models are evaluated with three different metrics: Accuracy@k, Precision@k and Recall@k. Applicants note Rank(x,u,k) the set of top k ranked hashtags by the model for image x and user u, and GT(x,u) the set of hashtags tagged by the user u for the image x.

Accuracy@k (A@k). The Accuracy@k measures how often at least one of the ground-truth hashtags appears in the k highest-ranked predictions.

$$A@k = \sum_{i=1}^{N} \frac{\mathbb{1}[\text{Rank}(x_i, u_i, k) \cap GT(x_i, u_i) \neq \emptyset]}{N} \quad (12)$$

Precision@k (P@k). The Precision@k computes the proportion of relevant hashtags in the top-k predicted hashtags. HR($x_i, u_i$) is the rank of the positive hashtag with the lowest score. Applicants use this definition because a number of images have less than 10 hashtags.

$$P@k = \frac{1}{N} \sum_{i=1}^{N} \frac{|\text{Rank}(x_i, u_i, k) \cap GT(x_i, u_i)|}{\min(k, HR(x_i, u_i))} \quad (13)$$

Recall@k (R@k). The Recall@k computes the proportion of relevant hashtags found in the top-k predicted hashtags.

$$R@k = \frac{1}{N} \sum_{i=1}^{N} \frac{|\text{Rank}(x_i, u_i, k) \cap GT(x_i, u_i)|}{|GT(x_i, u_i)|} \quad (14)$$

Table 1, shown below, summarizes the performance of the various models based on the aforementioned metrics:

TABLE 1

Hashtag prediction results on both datasets (higher is better). We compare several strategy to extract a user representation based on user image history. The performances on the open vocabulary dataset are evaluated only with the hashtags seen during training. The performances with the unseen hashtags are show in Table 2. ~~GloVe~~ means that the pretrained GloVe embeddings are not used.

| | MODEL | USER REP. | USER FUSION | A@1 | A@10 | P@10 | R@1 | R@10 |
|---|---|---|---|---|---|---|---|---|
| FIXED VOCAB (~18.5 k hashtags) | [A] frequency | | — | 0.01 | 0.13 | 0.03 | 0.00 | 0.07 |
| | [B] user agnostic | | — | 14.57 | 37.60 | 7.52 | 4.79 | 15.86 |
| | [C] used hashtags | ✓ | max | 61.62 | 80.43 | 37.37 | 26.02 | 55.88 |
| | [D] hashtag occurences | ✓ | sum | 62.09 | 80.56 | 37.58 | 26.26 | 56.13 |
| | Ours (hashtag) | ✓ | GRU | 71.90 | 85.21 | 47.60 | 31.51 | 62.83 |
| | Ours (image + hashtag) | ✓ | GRU | 74.13 | 87.49 | 50.88 | 33.36 | 66.49 |
| OPEN VOCAB (~440 k hashtags) | [A] frequency | | — | 0.00 | 0.01 | 0.01 | 0.00 | 0.00 |
| | [B] user agnostic | | — | 13.47 | 34.71 | 6.64 | 4.26 | 13.49 |
| | [E] hashtag sum | ✓ | sum | 59.93 | 79.75 | 36.24 | 23.42 | 54.20 |
| | Ours (hashtag) | ✓ | GRU | 65.06 | 83.31 | 44.84 | 26.87 | 60.69 |
| | Ours (image + hashtag) ~~GloVe~~ | ✓ | GRU | 46.24 | 64.17 | 20.36 | 17.08 | 31.49 |
| | Ours (image + hashtag) | ✓ | GRU | 67.46 | 86.32 | 46.68 | 27.90 | 62.99 |

Applicants make six observations based on Table 1.

First, the user agnostic models ([A, B]) perform poorly for all metrics with respect to the user-specific models as already shown in [11, 43]. It also demonstrates that the user history can be used to extract good user representations.

Second, Applicants observe that the hashtag occurrences user representation [D] is slightly better than the used hashtags user representation [C]. The reason is that the [D] is richer than [C] because it encodes user hashtag frequency.

Third, modelling the temporal information of the hashtags with a recurrent network (the model with only hashtags) significantly improves the performances with respect to hashtag pooling strategy ([C, D]).

Fourth, using the visual information improves the results because it can exploit the correlations between the hashtags and the visual content of the images. Fifth, Applicants observe that the pretrained word embeddings are very important on imbalanced data because it allows to transfer knowledge between hashtags.

Finally, Applicants observe the same behaviour on the closed set and open set datasets, so the user representation model can be used in both settings.

Results for Unseen Hashtags.

Applicants also evaluate the ability of the machine learning model 100A to generalize and predict unseen hashtags. In the first experiment, named UNSEEN HASHTAGS, Applicants only evaluate the results of unseen hashtags (equivalent to ZSL setting).

In the second experiment, named ALL HASHTAGS, Applicants evaluate the performances for all the hashtags (similar to GZSL setting).

While the first experiment directly evaluates the performance of the machine learning model 100A in predicting unseen hashtags, the second experiment is more realistic because the machine learning model 100A has to predict hashtags among both seen and unseen hashtags.

The results of these experiments with the machine learning model 100A and the example embodiment of the machine learning model 100A with solely data labels being processed in the user representation model 102A, on the open vocabulary dataset are shown in Table 2, below:

TABLE 2

Hashtag prediction results on hashtags unseen during training and all the hashtags on the open vocabulary dataset.

| MODEL | UNSEEN HASHTAGS (~120 k hashtags) | | | | | ALL HASHTAGS (~560 k hashtags) | | | | |
| --- | --- | --- | --- | --- | --- | --- | --- | --- | --- | --- |
| | A @ 1 | A @ 10 | P @ 10 | R @ 1 | R @ 10 | A @ 1 | A @ 10 | P @ 10 | R @ 1 | R @ 10 |
| [B] user agnostic | 0.06 | 0.40 | 0.08 | 0.03 | 0.25 | 12.89 | 33.21 | 6.07 | 3.78 | 12.05 |
| [E] sum hashtags | 36.41 | 55.40 | 32.51 | 26.60 | 48.12 | 58.91 | 79.47 | 34.08 | 21.35 | 51.42 |
| Ours (hashtag) | 44.07 | 60.15 | 39.35 | 33.97 | 53.05 | 65.75 | 83.90 | 43.99 | 26.09 | 59.14 |
| Ours (image + hashtag) | 45.98 | 62.62 | 41.31 | 35.53 | 55.30 | 68.06 | 86.91 | 45.80 | 27.03 | 61.39 |

Applicants observe that the machine learning model 100A is able to predict unseen hashtags. With respect to the user representation, Applicants draw the same conclusions as presented for seen hashtags in Table 1: modeling the user is important for unseen tags, and the machine learning model 100A with the user representation model 102A has the best results because it models the temporal information and exploits the visual content.

Comparison with [43].

Applicants perform experiments on the fixed vocabulary dataset with a similar setting that [43] i.e., the same set of users during training and testing. Applicants re-implement the user-specific Tensor (MCLL) model of [43].

Applicants report the results of the machine learning model 100A with the with the user representation model 102A computed only on the training images (fixed user history, shown as FH in Table 3) and the machine learning model 100A with the with the user representation model 102A computed using all previous images.

The results are summarized in Table 3:

TABLE 3

Comparison with [43] on a fixed set of users. Ours-FH means that our user representation is computed with on a fixed history (training images).

| MODEL | A@1 | A@10 | P@10 | R@1 | R@10 |
| --- | --- | --- | --- | --- | --- |
| [43] | 35.92 | 63.07 | 11.51 | 15.91 | 37.79 |
| Ours-FH | 48.20 | 69.59 | 33.03 | 20.50 | 46.41 |
| Ours | 73.19 | 87.28 | 50.44 | 32.19 | 65.86 |

Applicants observe that the machine learning model 100A is better than [43] because [43] needs a lot of images to have good performances. Another advantage is of the machine learning model 100A is that it can exploit new images without retraining.

Machine Learning Model Analysis

In this section, Applicants analyse important parameters of the model, in accordance with some embodiments: the dimension of the user representation model output 102, the size of the image history (e.g., the first data set, or the new data set) to extract the user representation and the importance of the fusion model 106.

User Representation Dimension.

Applicants first analyze the importance of the user representation dimensionality, which is the hidden state dimension of the GRU 130 in the machine learning model 100A.

Figure 3:
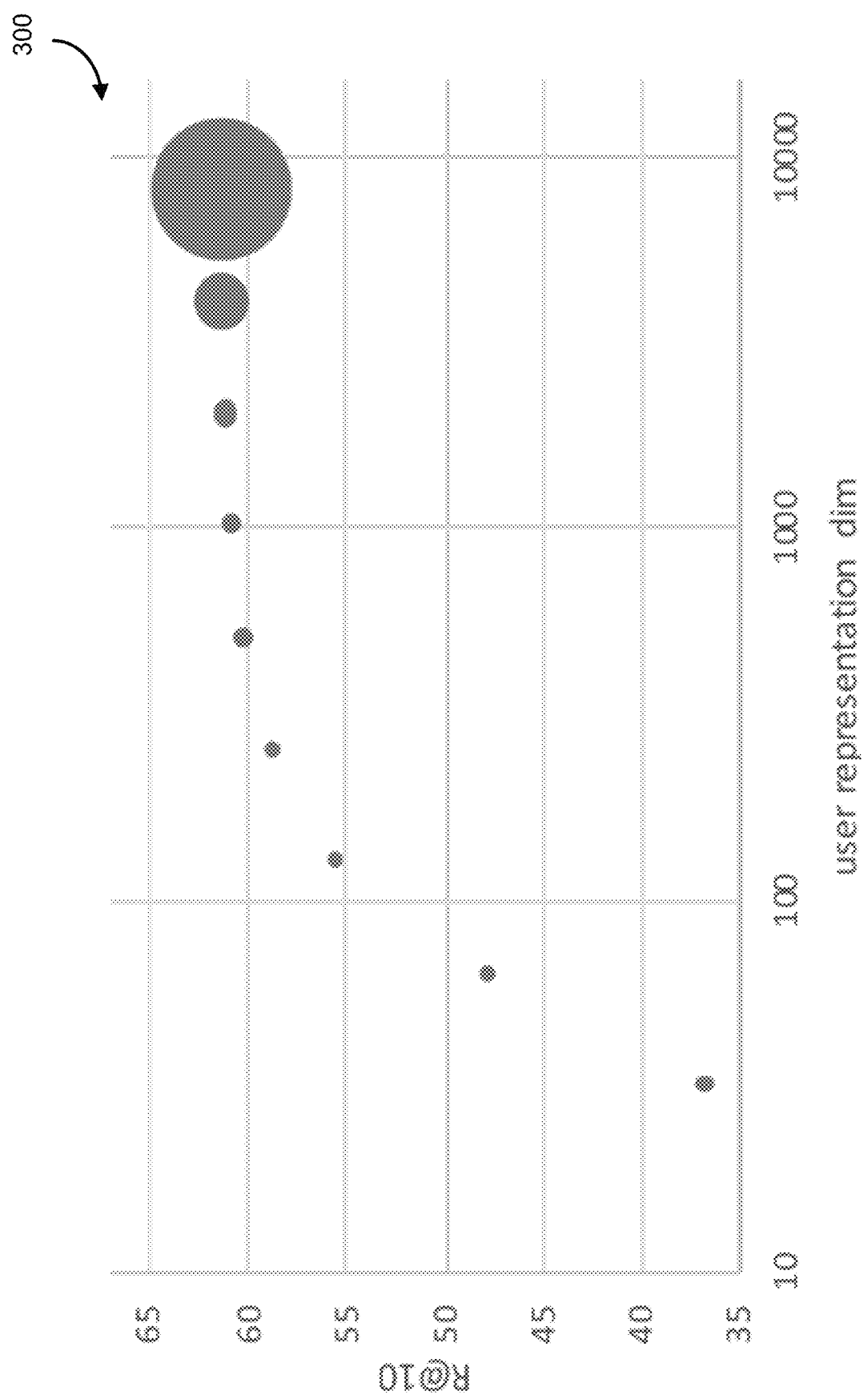
FIG. 3 is a graph showing comparing a recall accuracy with a user representation dimension, according to some embodiments.

Applicants show in FIG. 3 the results for a large range of user representation model output 102 dimensions (32 to 8192). Applicants observe that using a large user representation model output 102 is better than small user representation model output 102 for all metrics.

However, using a large user representation model output 102 is more time consuming and requires more memory to store the user representation model output 102. Applicants observe that 1024 dimensions is a good trade-off between accuracy and computation time.

Analysis of the History Size.

Applicants analyze the importance of the history size e.g., the number of images used to compute the user representation.

For each user, the first 50 images are used to build the user history and the remaining images are used for testing (users with less than 51 images are ignored).

For instance for the history size of 10, Applicants use the 40-th to the 49-th (included) images to compute the user representation.

The results of the impact of user history size on machine learning model 100A performance are shown in Table 4:

TABLE 4

Analysis of the importance of the history size i.e. the number of images used to compute the user representation. The history size of 0 is a user agnostic model.

| HISTORY | A@1 | A@10 | P@10 | R@1 | R@10 |
| --- | --- | --- | --- | --- | --- |
| 0 | 7.55 | 21.04 | 3.60 | 2.27 | 6.93 |
| 1 | 29.94 | 54.76 | 17.93 | 10.44 | 27.68 |
| 2 | 30.84 | 54.87 | 19.13 | 11.05 | 28.68 |
| 5 | 31.67 | 55.55 | 19.72 | 11.41 | 29.35 |
| 10 | 32.28 | 56.33 | 19.97 | 11.58 | 29.77 |
| 20 | 32.68 | 56.85 | 20.15 | 11.70 | 30.01 |
| 30 | 32.81 | 57.02 | 20.20 | 11.72 | 30.09 |
| 40 | 32.90 | 57.17 | 20.24 | 11.75 | 30.16 |
| 50 | 33.08 | 57.56 | 20.30 | 11.76 | 30.34 |

Applicants observe that the machine learning model 100A, trained or used to process only one image in the user history is significantly better than a user agnostic model.

The machine learning model 100A can compute an accurate user representation with fewer images, and increasing the number of images in the user history may improve the performance of the machine learning model 100A according to all metrics. The conclusion of this experiment is: the more images associated with the user, the better the machine learning model 100A.

Image-Hashtags Fusion.

The last analysis is related to the combination of the image and hashtags branches (e.g., via the fusion model 126) in the user representation model (Equation 6).

In Table 5, Applicants show the results of performance of the machine learning model 100A with several standard multi-modal fusion operators, and the machine learning model 100A with only the hashtags branch:

TABLE 5

Analysis of the image-hashtags fusion.

| FUSION | A@1 | A@10 | R@1 | R@10 |
|---|---|---|---|---|
| only hashtags | 65.16 | 83.26 | 26.12 | 60.89 |
| sum | 65.29 | 83.21 | 26.19 | 60.75 |
| concatenation | 65.36 | 83.24 | 26.21 | 60.71 |
| bilinear [4] | 65.95 | 85.63 | 26.69 | 59.94 |
| TIRG [44] | 63.97 | 81.94 | 25.10 | 59.35 |
| eltwise product | 67.28 | 86.27 | 27.18 | 62.88 |

Applicants use ReLU for each model except for the element-wise product model where Applicants use SELU to avoid having a vector with too many zeros. Applicants note that only the element-wise product fusion improves the performances significantly. Applicants believe this is because the element-wise product fusion forces the model to exploit both image and hashtags representations.

This experiment also shows that the hashtags branch is more informative than the image branch. Applicants note that the conclusions are different of [44] which shows the best fusion depends of the task.

User Retrieval

In this section, Applicants analyze the discriminative power of the machine learning model 100A, according to some embodiments. To perform the analysis, Applicants consider the user retrieval task: given a user representation (e.g., the user representation model output 102), the goal is to find a user representation of the same user computed with non-overlapping image histories i.e., each image is used only in one image history.

Applicants use users from the test set and an image history size of 20. For instance, given a user, Applicants first use the first 20 images to compute a user representation, then Applicants use the next 20 images to compute another user representation of the same user. For this experiment, Applicants compute 33,648 user representations from 6,139 users. The user representations are $l_2$ normalized and Applicants use the cosine similarity to rank the users. To evaluate the performances, Applicants use the Accuracy@k metric and the median rank metric, with performance shown in Table 6 below:

TABLE 6

User retrieval results. MR is the median rank (lower is better) and dim is the user representation dimension.

| | USER REP. | A@1 | A@10 | MR | DIM |
|---|---|---|---|---|---|
| FIXED | [C] used | 33.48 | 46.95 | 16 | 18.583 |
| | [D] occurence | 33.64 | 46.94 | 17 | 18.583 |
| | Ours (tag) | 42.95 | 58.47 | 3 | 1024 |
| | Ours (im + tag) | 45.64 | 61.45 | 2 | 1024 |
| OPEN | [E] sum tags | 35.19 | 44.81 | 29 | 300 |
| | Ours (tag) | 45.15 | 59.27 | 3 | 1024 |
| | Ours (im + tag) | 47.90 | 61.56 | 2 | 1024 |

The results in Table 6 show that the machine learning model 100A is able to extract accurate user representations from different image history sizes. Note that the machine learning model 100A is not trained for this task. Applicants observe the same conclusions for hashtag prediction.

Despite the user representation being 18 times smaller than [C] and [D] (which are sparse vectors), Applicants note that the machine learning model 100A improves the A@1 performance by 12 pt. On the contrary [E] has a smaller dimension that the model, but the representations are not discriminative enough.

Figure 7:
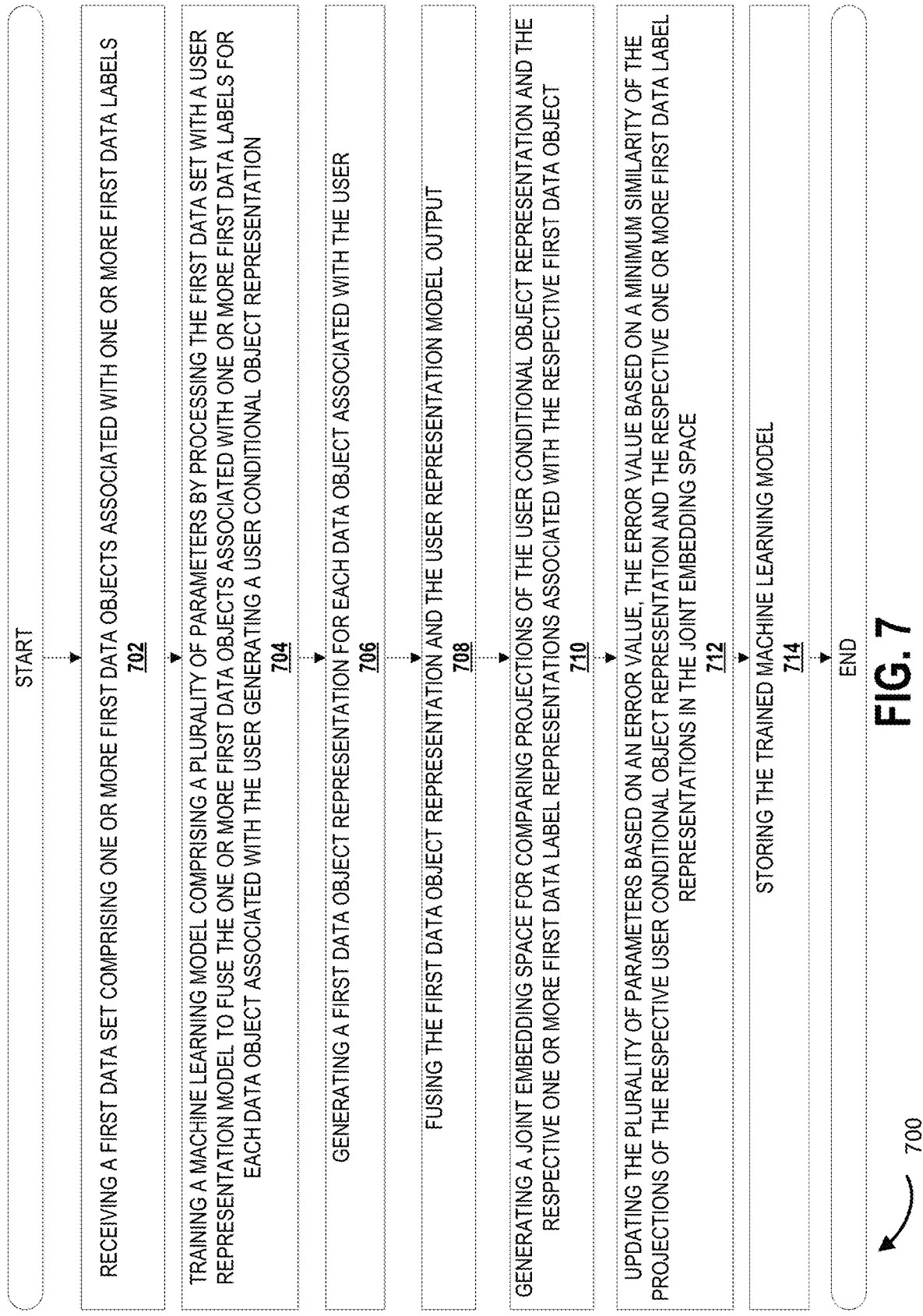
FIG. 7 is an example method for training a machine learning model having a user representation, according to some embodiments.

FIG. 7 is an example method for generating a data structure representative of the machine learning model 100A, according to some embodiments.

In a first example, the method 700 is applied using the data sets that include a series of dates that a payee was added by a user (e.g., logs of customer payment histories), and a set of company IDs or other labels that the user is known to use (e.g., applied onto the dates the user added a payee). In other examples, the data sets can include SKU level data, transaction history data, and location data, among others.

A system can be trained and established to maintain and update user representations over a period of time in accordance with the method 700.

Method 700 is a computer implemented method and can be used for learning one or more user representations from open vocabulary data sets, and the method may include the various steps described below. The steps may be substituted, deleted, modified, replaced, and may be presented in different orders or combinations. The following is an example of a non-limiting embodiment.

At step 702, a first data set comprising one or more first data objects associated with one or more first data labels, each of the one or more first data objects associated with at least one unique user data, is received.

At step 704, a machine learning model for predicting data labels is trained, the machine learning model comprising a plurality of parameters representative of a user representation model.

The machine learning model for predicting data labels is trained by, for each unique user data, processing, with the user representation model, the one or more first data objects and associated one or more first data labels associated with the respective user data to generate a user representation model output by fusing the one or more first data objects and the respective associated one or more first data label pairs associated with the respective unique user data.

At step 706, for each first data object associated with the respective user data, a first data object representation of the respective first data object is generated.

At step 708, for each first data object associated with the respective unique user data, the first data object representation and the user representation model output is fused generating a user conditional object representation.

At step 710, for each first data object associated with the respective unique user data, a joint embedding space for comparing projections of the user conditional object representation and the respective one or more first data labels, or first data label representations, associated with the respective first data object is generated.

At step 712, for each first data object associated with the respective unique user data, the plurality of parameters based on an error value is updated, the error value based on a maximum similarity of the projections of the respective user conditional object representation and the respective one or more first data labels in the joint embedding space.

At step 714, the trained machine learning model is stored.

The trained machine learning model is stored and encapsulated in the form of a data structure. The data structures forming the trained machine learning model may be consumed by downstream systems to generate one or more predictions in respect of a user's preferences, which may aid in generating improved offers or products for the user. The user's feedback can be used to further refine the trained machine learning model predictions by updating a user representation model output specific to the user.

The method 700 described an example method for training a machine learning model. Example embodiments include methods with steps from method 700 arranged in all possible combinations. Thus if one method embodiment comprises steps 1, 2 and 3, and a second method embodiment comprises steps 1 and 4, then the inventive subject matter is also considered to include other remaining combinations of 1, 2, 3, or 4, even if not explicitly disclosed.

FIG. 8 is a schematic diagram of a computing device 800 such as a server, which in some embodiments, may be a special purpose machine that is specifically configured for generating user representations, having, for example, specialized hardware components and/or software components.

In example embodiments, computing device 800 is a special purpose machine that is located within a data center. The special purpose computing device 800, for example, is a portable computing mechanism that is placed into a data center as a rack server or rack server component. The special purpose computing device 800 may be operated independently, having all of the elements necessary to complete the methods set out here, or the special purpose computing device 800 may be connected to external data storage machines for receiving data sets.

In example embodiments, the special purpose computing device 800 interoperates and interconnects with other devices, for example, across a network or a message bus. In example embodiments, the network is an organizational network, not open to the public. In example embodiments, the special purpose computing device 800 is connected to the network in a manner where information is only allowed to flow in one direction, such as an uplink.

As depicted, the computing device includes at least one processor 802, memory 808, at least one I/O interface 806, and at least one network interface 808.

Processor 802 may be an Intel or AMD x86 or x64, PowerPC, ARM processor, or the like. Memory 804 may include a combination of computer memory that is located either internally or externally such as, for example, random-access memory (RAM), read-only memory (ROM), compact disc read-only memory (CDROM).

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WMAX), SS7 signaling network, fixed line, local area network, wide area network, and others.

Variations

As noted above, while example embodiments are described in relation to image-hashtag analysis, the implementation is not limited to image-hashtag pairs, but rather, a user representation may be generated based on different data sets that have some aspects of relationship between one another.

Additional variations are described in this section. The variations are not meant to be limiting, and other variations are possible.

Accordingly, in a first variation, the first data set may be other data other than images, such as financial transaction data, and the second data set includes metadata tags describing one or more businesses. Based on the mappings generated, which are based on characteristics of businesses known to be frequented by the user (e.g., transactions show independent coffee shops, located at ground level, near transit stations), a new set of metadata tags for a new business can be used to establish a probability score that the user would frequent such new business.

In an alternate variation, the system is used instead for mapping credit card transactions to SKU level product codes. SKUs are mapped to vector representations where nearby products have nearby vectors.

REFERENCES

[1] Z. Akata, F. Perronnin, Z. Harchaoui, and C. Schmid. Label-Embedding for Image Classification. *IEEE Transactions on Pattern Analysis and Machine Intelligence (TPAMI)*, 2016. 3

[2] Z. Akata, S. Reed, D. Walter, H. Lee, and B. Schiele. Evaluation of output embeddings for fine-grained image classification. In *IEEE Conference on Computer Vision and Pattern Recognition (CVPR)*, 2015. 3

[3] J. Ba, K. Swersky, S. Fidler, and R. Salakhutdinov. Predicting Deep Zero-Shot Convolutional Neural Networks using Textual Descriptions. In *IEEE International Conference on Computer Vision (ICCV)*, 2015. 3

[4] H. Ben-younes, R. Cadene, M. Cord, and N. Thome. MUTAN: Multimodal Tucker Fusion for Visual Question Answering. In *IEEE International Conference on Computer Vision (ICCV)*, 2017. 7, 10

[5] P. Bojanowski, E. Grave, A. Joulin, and T. Mikolov. Enriching Word Vectors with Subword Information. In *Transactions of the Association for Computational Linguistics*, 2017. 5

[6] M. Bucher, S. Herbin, and F. Jurie. Improving Semantic Embedding Consistency by Metric Learning for Zero-Shot Classification. In *European Conference on Computer Vision (ECCV)*, 2016. 3

[7] M. Carvalho, R. Cadne, D. Picard, L. Soulier, N. Thome, and M. Cord. Cross-Modal Retrieval in the Cooking Context: Learning Semantic Text-Image Embeddings. In *ACM Special Interest Group on Information Retrieval (SIGIR)*, 2018. 3

[8] W.-L. Chao, S. Changpinyo, B. Gong, and F. Sha. An Empirical Study and Analysis of Generalized Zero-Shot Learning for Object Recognition in the Wild. In *European Conference on Computer Vision (ECCV)*, 2016. 3

[9] J. Chung, C. Gulcehre, K. Cho, and Y. Bengio. Empirical Evaluation of Gated Recurrent Neural Networks on Sequence Modeling. In *Advances in Neural Information Processing Systems Workshop (NeurIPS)*, 2014. 5, 6

[10] J. Deng, O. Russakovsky, J. Krause, M. S. Bernstein, A. Berg, and L. Fei-Fei. Scalable Multi-label Annotation. In *Proceedings of the SIGCHI Conference on Human Factors in Computing Systems*, 2014. 1

[11] E. Denton, J. Weston, M. Paluri, L. Bourdev, and R. Fergus. User conditional hashtag prediction for images. In *International Conference on Knowledge Discovery and Data Mining (KDD)*, 2015. 1, 2, 4, 5, 7, 8

[12] B. Dhingra, Z. Zhou, D. Fitzpatrick, M. Muehl, and W. W. Cohen. Tweet2Vec: Character-Based Distributed Representations for Social Media. In *Association for Computational Linguistics (ACL)*, 2016. 1

[13] B. Duke and G. W. Taylor. Generalized Hadamard-Product Fusion Operators for Visual Question Answering. In *arXiv 1803.09374*, 2018. 2, 7

[14] M. Engilberge, L. Chevallier, P. Prez, and M. Cord. Finding beans in burgers: Deep semantic-visual embedding with localization. In *IEEE Conference on Computer Vision and Pattern Recognition (CVPR)*, 2018. 3

[15] F. Faghri, D. J. Fleet, J. R. Kiros, and S. Fidler. VSE++: Improved Visual-Semantic Embeddings. In *British Machine Vision Conference (BMVC)*, 2018. 3

[16] A. Frome, G. Corrado, J. Shlens, S. Bengio, J. Dean, M. Ranzato, and T. Mikolov. DeViSE: A Deep Visual-Semantic Embedding Model. In *Advances in Neural Information Processing Systems (NeurIPS)*, 2013. 3

[17] J. Fu, Y. Wu, T. Mei, J. Wang, H. Lu, and Y. Rui. Relaxing From Vocabulary: Robust Weakly-Supervised Deep Learning for Vocabulary-Free Image Tagging. In *IEEE International Conference on Computer Vision (ICCV)*, 2015. 3

[18] A. Fukui, D. H. Park, D. Yang, A. Rohrbach, T. Darrell, and M. Rohrbach. Multimodal Compact Bilinear Pooling for Visual Question Answering and Visual Grounding. In *Conference on Empirical Methods in Natural Language Processing (EMNLP)*, 2016. 2, 4, 7

[19] A. Gordo, J. Almazan, N. Murray, and F. Perronnin. LEWIS: Latent Embeddings for Word Images and their Semantics. In *IEEE International Conference on Computer Vision (ICCV)*, 2015. 3

[20] A. Gordo, J. Almazan, J. Revaud, and D. Larlus. End-to-end Learning of Deep Visual Representations for Image Retrieval. In *International Journal of Computer Vision (IJCV)*, 2017. 3

[21] K. He, X. Zhang, S. Ren, and J. Sun. Deep residual learning for image recognition. In *IEEE Conference on Computer Vision and Pattern Recognition (CVPR)*, 2016. 1, 3, 6

[22] H. Izadinia, B. C. Russell, A. Farhadi, M. D. Hoffman, and A. Hertzmann. Deep Classifiers from Image Tags in the Wild. In *ACM Multimedia*, 2015. 1, 2

[23] A. Joulin, L. van der Maaten, A. Jabri, and N. Vasilache. Learning Visual Features from LargeWeakly Supervised Data. In *European Conference on Computer Vision (ECCV)*, 2016. 6

[24] J. Justin, B. Lamberto, and L. Fei-Fei. Love Thy Neighbors: Image Annotation by Exploiting Image Metadata. In *IEEE International Conference on Computer Vision (ICCV)*, 2015. 1

[25] J.-H. Kim, K.-W. On, W. Lim, J. Kim, J.-W. Ha, and B.-T. Zhang. Hadamard Product for Low-rank Bilinear Pooling. In *International Conference on Learning Representations (ICLR)*, 2017. 2, 4, 7

[26] D. P. Kingma and J. Ba. Adam: A Method for Stochastic Optimization. In *International Conference on Learning Representations (ICLR)*, 2015. 6

[27] R. Kiros, R. Salakhutdinov, and R. S. Zemel. Unifying Visual-Semantic Embeddings with Multimodal Neural Language Models. In *arXiv 1411.2539*, 2014. 3

[28] A. Krizhevsky, I. Sutskever, and G. Hinton. ImageNet Classification with Deep Convolutional Neural Networks. In *Advances in Neural Information Processing Systems (NeurIPS)*, 2012. 1, 3

[29] A. Kuznetsova, H. Rom, N. Alldrin, J. Uijlings, I. Krasin, J. Pont-Tuset, S. Kamali, S. Popov, M. Malloci, T. Duerig, and V. Ferrari. The Open Images Dataset V4: Unified image classification, object detection, and visual relationship detection at scale. In *arXiv 1811.00982*, 2018. 1

[30] C. H. Lampert, H. Nickisch, and S. Harmeling. Learning to detect unseen object classes by between-class attribute transfer. In *IEEE Conference on Computer Vision and Pattern Recognition (CVPR)*, 2009. 3

[31] C. H. Lampert, H. Nickisch, and S. Harmeling. Attribute-based classification for zero-shot visual object categorization. *IEEE Transactions on Pattern Analysis and Machine Intelligence (TPAMI)*, 2014. 3

[32] D. Mahajan, R. Girshick, V. Ramanathan, K. He, M. Paluri, Y. Li, A. Bharambe, and L. van der Maaten. Exploring the Limits of Weakly Supervised Pretraining. In *European Conference on Computer Vision (ECCV)*, 2018. 1, 6

[33] J. McAuley and J. Leskovec. Image Labeling on a Network: Using Social-Network Metadata for Image Classification. In *European Conference on Computer Vision (ECCV)*, 2012. 1

[34] T. Mikolov, I. Sutskever, K. Chen, G. S. Corrado, and J. Dean. Distributed Representations of Words and Phrases and their Compositionality. In *Advances in Neural Information Processing Systems (NeurIPS)*, 2013. 5

[35] J. Pennington, R. Socher, and C. D. Manning. Glove: Global vectors for word representation. In *Conference on Empirical Methods in Natural Language Processing (EMNLP)*, 2014. 3, 5, 6

[36] M. Rohrbach, M. Stark, and B. Schiele. Evaluating knowledge transfer and zero-shot learning in a large-scale setting. In *IEEE Conference on Computer Vision and Pattern Recognition (CVPR)*, 2011. 3

[37] A. Salvador, N. Hynes, Y. Aytar, J. Marin, F. Ofli, I. Weber, and A. Torralba. Learning Cross-modal Embeddings for Cooking Recipes and Food Images. In *IEEE Conference on Computer Vision and Pattern Recognition (CVPR)*, 2017. 3

[38] S. Shankar, Y. Halpern, E. Breck, J. Atwood, J. Wilson, and D. Sculley. No Classification without Representation: Assessing Geodiversity Issues in Open Data Sets for the Developing World. In *NIPS 2017 workshop: Machine Learning for the Developing World*, 2017. 2

[39] K. Shuster, S. Humeau, H. Hu, A. Bordes, and J. Weston. Engaging Image Captioning Via Personality. In *arXiv 1810.10665*, 2018. 2, 3

[40] C. Sun, A. Shrivastava, S. Singh, and A. Gupta. Revisiting Unreasonable Effectiveness of Data in Deep Learning Era. In *IEEE International Conference on Computer Vision (ICCV)*, 2017. 1, 6

[41] B. Thomee, B. Elizalde, D. A. Shamma, K. Ni, G. Friedland, D. Poland, D. Borth, and L.-J. Li. YFCC100M: The New Data in Multimedia Research. *Communications of the ACM*, 2016. 7

[42] A. Veit, S. Belongie, and T. Karaletsos. Conditional Similarity Networks. In *IEEE Conference on Computer Vision and Pattern Recognition (CVPR)*, 2017. 3

[43] A. Veit, M. Nickel, S. Belongie, and L. van der Maaten. Separating Self-Expression and Visual Content in Hashtag Supervision. In *IEEE Conference on Computer Vision and Pattern Recognition (CVPR)*, 2017. 1, 2, 4, 5, 6, 7, 8, 14

[44] N. Vo, L. Jiang, C. Sun, K. Murphy, L.-J. Li, L. Fei-Fei, and J. Hays. Composing Text and Image for Image Retrieval—An Empirical Odyssey. In *arXiv 1812.07119*, 2018. 3, 9, 10

[45] L. Wang, Y. Li, J. Huang, and S. Lazebnik. Learning Two-Branch Neural Networks for Image-Text Matching Tasks. In *IEEE Transactions on Pattern Analysis and Machine Intelligence (TPAMI)*, 2018. 3

[46] L. Wang, Y. Li, and S. Lazebnik. Learning Deep Structure-Preserving Image-Text Embeddings. In *IEEE Conference on Computer Vision and Pattern Recognition (CVPR)*, 2015. 3

[47] Y.-X. Wang, D. Ramanan, and M. Hebert. Learning to Model the Tail. In *Advances in Neural Information Processing Systems (NeurIPS)*, 2017. 4

[48] J. Weston, S. Chopra, and K. Adams. #tagspace: Semantic embeddings from hashtags. In *Conference on Empirical Methods in Natural Language Processing (EMNLP)*, 2014. 1, 2, 5

[49] Y. Xian, C. H. Lampert, B. Schiele, and Z. Akata. Zero-Shot Learning—A Comprehensive Evaluation of the Good, the Bad and the Ugly. In *IEEE Transactions on Pattern Analysis and Machine Intelligence (TPAMI)*, 2018. 3

[50] Z. Yu, J. Yu, J. Fan, and D. Tao. Multi-modal Factorized Bilinear Pooling with Co-Attention Learning for Visual Question Answering. In *IEEE International Conference on Computer Vision (ICCV)*, 2017. 2, 7

[51] Z. Zhang and V. Saligrama. Zero-shot learning via semantic similarity embedding. In *IEEE International Conference on Computer Vision (ICCV)*, 2015. 3

APPENDIX

Dataset

In this section, Applicants give further information about the dataset used for experimentation.

Statistics about the datasets used for training and comparing models are shown in Table 7.

TABLE 7

Dataset statistics.

|  | TRAIN | VAL | TEST |
|---|---|---|---|
| OPEN VOCABULARY | | | |
| num users | 21,441 | 3,070 | 6,130 |
| avg images per user | 119 | 119 | 119 |
| avg hashtags per image | 4.49 | 4.46 | 4.49 |
| num hashtags | 442,054 | 487,454 | 568,833 |
| FIXED VOCABULARY | | | |
| num users | 14,574 | 2,042 | 4,066 |
| avg images per user | 111 | 113 | 110 |
| avg hashtags per image | 3.85 | 3.69 | 3.67 |
| num hashtags | 18,583 | — | — |

For the fixed vocabulary dataset, Applicants define the vocabulary as the set of hashtags that are used at least 50 times by at least 3 unique users. Note that the fixed vocabulary dataset has less users and images because a lot of images are ignored because they do not have at least one valid hashtag.

The open vocabulary dataset is more challenging than the fixed vocabulary dataset because there are more hashtags and the dataset is highly imbalanced.

Figure 4:
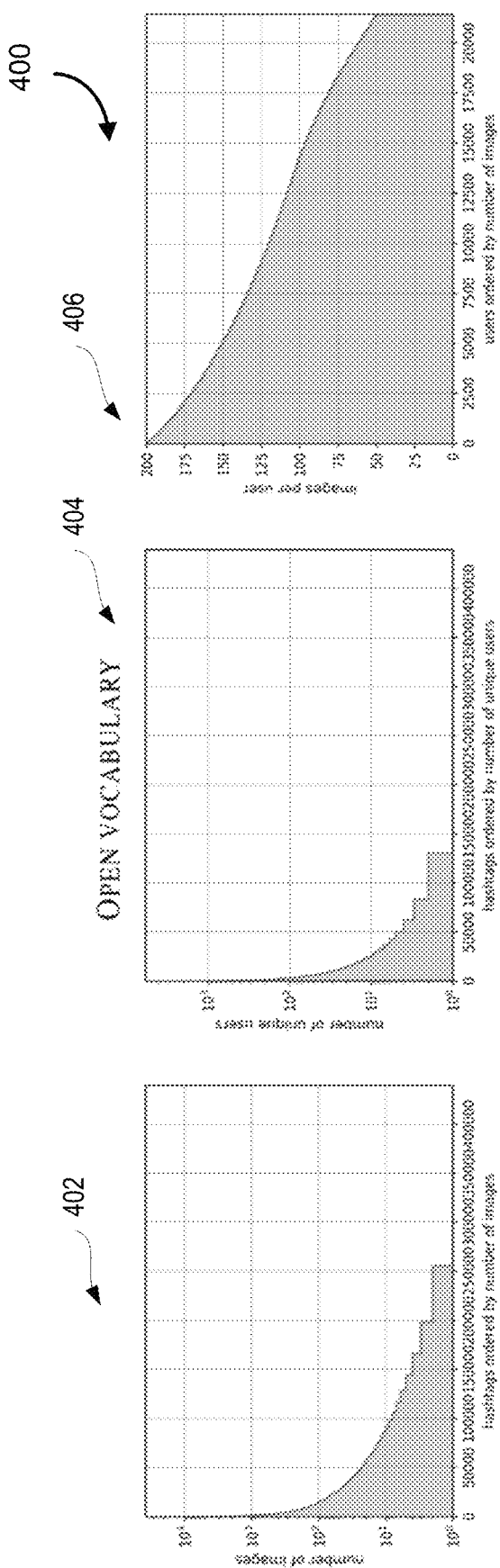
FIG. 4 is an example illustration of a dataset analysis, according to some embodiments.
Figure 4:
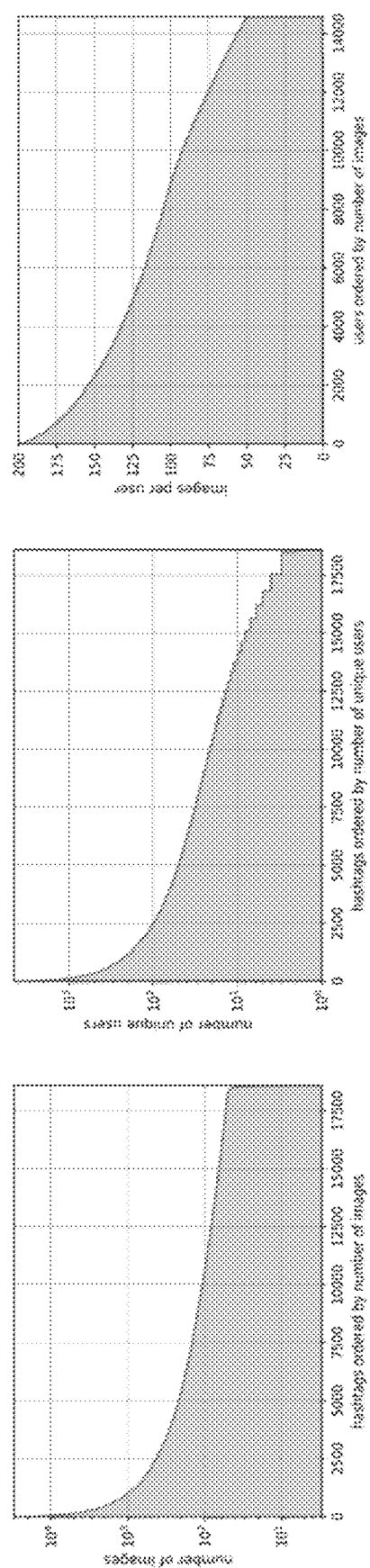

FIG. 4 shows the number of images associated with a particular hashtag in graphs 402 and 408, the number of unique users per hashtag in graphs 404 and 410, and the number of images per user for each dataset in graphs 406 and 412, for open and closed vocabulary data sets.

Figure 5:
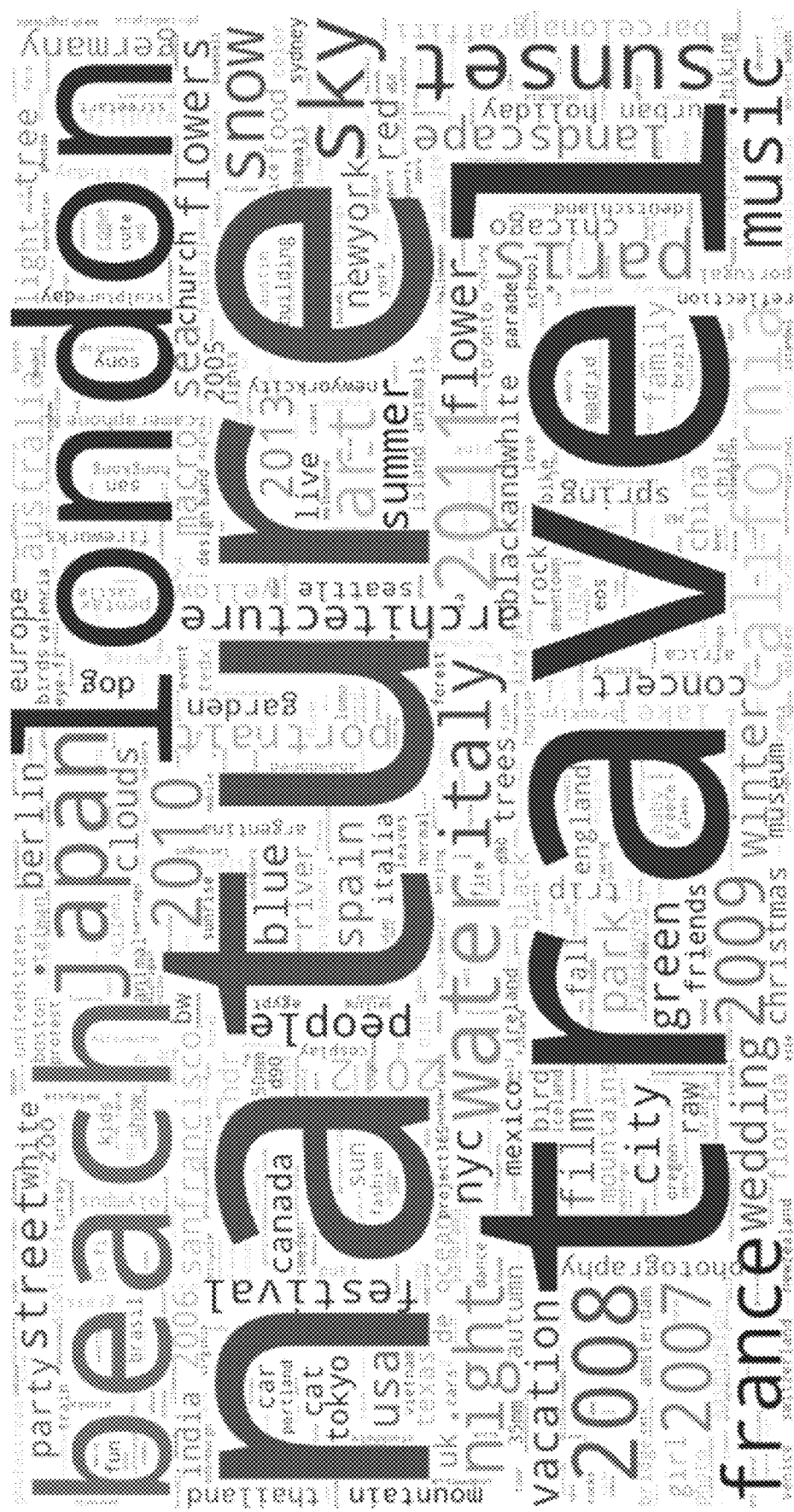
FIG. 5 is a word cloud representation of the hashtag distribution of an example open vocabulary dataset (training set), according to some embodiments.

FIG. 5 shows a word cloud representation of the hashtag distribution of the training set of the open vocabulary dataset.

Model Architecture for the Fixed Vocabulary Setting

Figure 6:
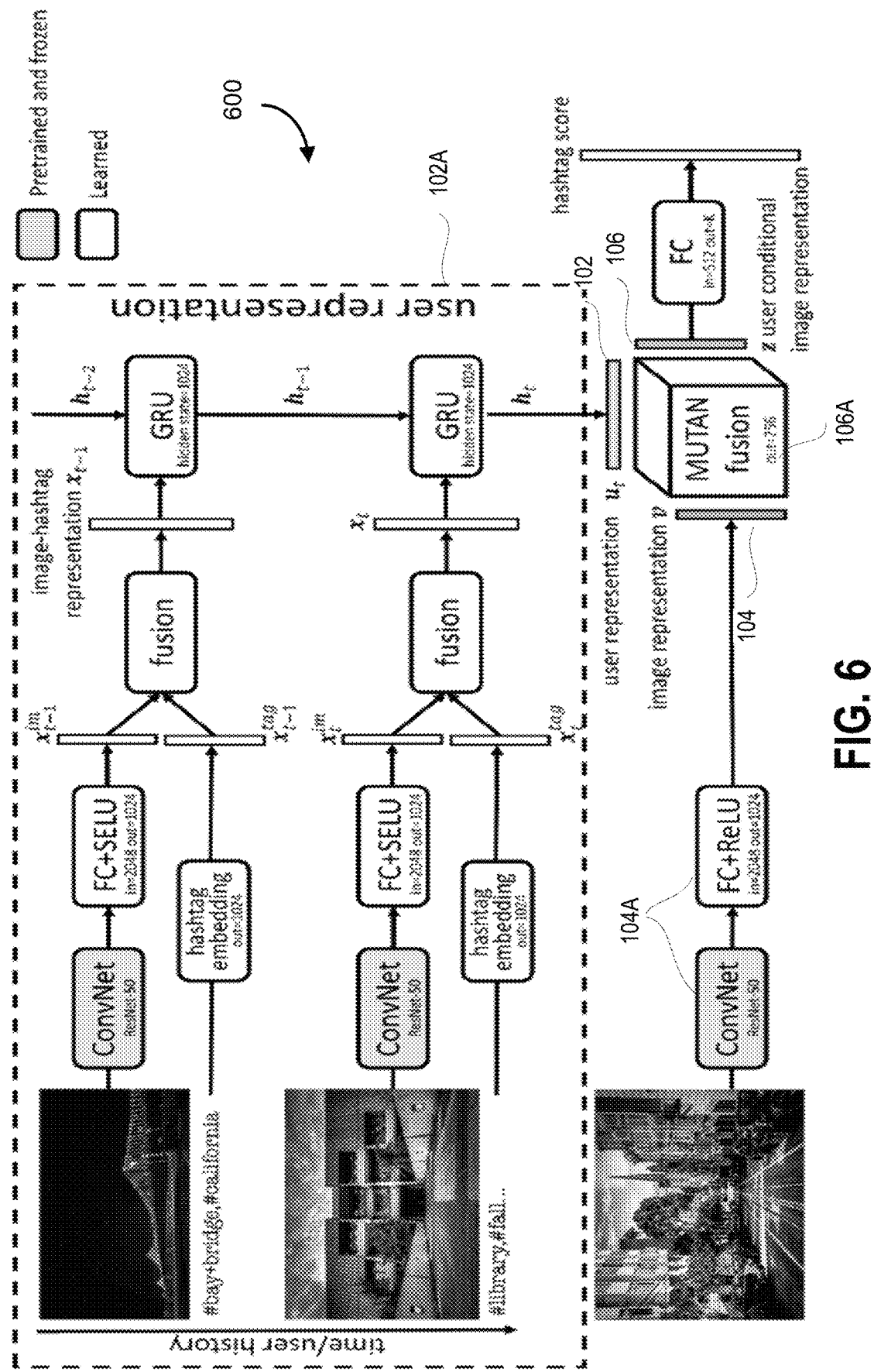
FIG. 6 is a prediction model architecture for a fixed vocabulary setting, according to some embodiments.

For the fixed vocabulary dataset, Applicants made some changes to the model proposed earlier to have a model more similar to [43]. The machine learning model 600 adapted for fixed data sets is shown in FIG. 6. The main difference between machine learning model 600 and machine learning model 1008, for example, is that Applicants do not use pretrained word embeddings in machine learning model 600. Instead, Applicants learn an embedding per hashtag as in [43]. Applicants use a fully-connected layer to predict the hashtags from the user conditional representation.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to the first data set(s) to perform the functions described herein and to generate the predicted data labels. The predicted data labels may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for training a machine learning model for predicting data labels, the machine learning model, the system comprising:
   at least data storage having stored thereon the machine learning model, the machine learning model comprising a plurality of parameters representative of a user representation model;
   at least one processor, in conjunction with at least one computer memory, configured to:
      receive a first data set comprising one or more first data objects associated with one or more first data labels, each of the one or more first data objects associated with a user represented by user data:
      train the machine learning model by:
         for each unique user representation in the user data:
            for each first data object associated with the unique user representation in the user data:
               process, with the user representation model, a respective first data object and associated one or more first data labels to fuse the respective first data object and the one or more first data labels associated with the respective first data object to generate a user representation model output;
               generate, using a convolutional neural network, a first data object representation of the respective first data object;
               fuse the first data object representation and the user representation model output to generate a user conditional object representation;
               generate a joint embedding space for comparing projections of the user conditional object representation and the one or more first data labels associated with the respective first data object;
            update the plurality of parameters representative of the user representation model based on an error value, the error value based on a maximum similarity of the projections of the respective user conditional object representation and the respective one or more first data labels in the joint embedding space; and
      store the trained machine learning model in the at least one computer memory;
   wherein the computer processor is configured to fuse the respective first data object and the one or more first data labels associated with the respective first data object by:
      generating a second data object representation of the respective first data object;
      generating a first data label representation for a sum of the one or more first data labels associated with the respective first data object;
      fusing the second data object representation and the first data label representation; and
      processing the fused second data object representation and first data label representation with a plurality of parameters for capturing sequential relationships within data to store interrelationships between respective fused second data object representation and first data label representations.

2. The system of claim 1, wherein the computer processor is configured to generate the second data object representation of the respective first data object by processing the respective first data object through a data object representation model using relation:

$$x_t^{im} = f^{im}(\mathcal{I}_t)$$

where $x_t^{im}$ denotes the second data object representation, ($\mathcal{I}_t$) denotes the respective first data object, and $f^{im}$ denotes the data object representation model.

3. The system of claim 1, wherein the computer processor is configured to generate the first data label representation for the respective first data object by processing the one or more first data labels associated with the respective first data object through a data label representation model using relation:

$$x_t^{tag} = f^{tag}(y_t)$$

where $x_t^{tag}$ denotes the first data label representation, $y_t$ denotes the sum of the one or more first data labels associated with the respective first data object, and $f^{tag}$ denotes the data label representation model.

4. The system of claim 1, wherein the computer processor is configured to fuse the second data object representation and the first data label representation by processing the second data object representation and the first data label representation through a fusion function using relation:

$$x_t = \text{fusion}(x_t^{im}, x_t^{tag})$$

where $x_t^{tag}$ denotes the first data object label representation, $x_t^{im}$ denotes the second data object representation, fusion denotes the fusion function, and $x_t$ denotes the fused second data object representation and first data label representation.

5. The system of claim 1, wherein the computer processor is configured to fuse the respective first data object representations and user representation model output to generate the user conditional object representation by processing the respective first data object representation and the user representation model output with a bilinear operator using relation:

$$z_j = v^T W_j u + b_j, j \in \{1, \ldots, d_c\}$$

the bilinear operator comprising a learned weight matrix $W_j \in \mathbb{R}^{d_v \times d_u}$ and a learned bias $b_j \in \mathbb{R}$ of the j-th dimension, where $v^T$ denotes the first data object representation, u denotes the user representation model output, and $z = [z_j]_{j=1,\ldots,d_c}$ denotes the user conditional object representation.

6. The system of claim 1, wherein the computer processor is configured to fuse the respective first data object representations and user representation model outputs to generate the user conditional object representation by processing the respective first data object representations and the user representation model output with a Multimodal Tucker Fusion (MUTAN) model for approximating bilinear operators.

7. The system of claim 1, wherein the error value is based on a posterior data object label probability established using relation:

$$p(\hat{y}|\mathcal{I}, u; \Theta) = \frac{f(\mathcal{I}, u, \hat{y}; \Theta)}{\sum_{y \in \mathcal{H}^{train}} f(\mathcal{I}, u, y; \Theta)}$$

where $\rho(\hat{y}_n^{(u)} | \mathcal{I}_t, u; \Theta)$ is the posterior data object label probability for a first user conditional object representation class $\hat{y}_n^{(u)}$, $f(\mathcal{I}_t, u, \hat{y}; \Theta)$ is a probability of the respective user conditional object representation in the joint embedding space being within the first user conditional object representation class, and $\Sigma_{y \in \mathcal{H}\ train} f(\mathcal{I}_t, u, \hat{y}; \Theta)$ is an aggregate probability of the user conditional object representation in the joint embedding space being other than the first user conditional object representation class.

8. The system of claim 7, wherein the error value is established using relation:

$$\mathcal{L}(\Theta) = -\frac{1}{U} \sum_{u \in \mathcal{U}} \frac{1}{N_u} \sum_{n=1}^{N_u} \log p(\hat{y}_n^{(u)} | \mathcal{I}, u; \Theta)$$

where $\hat{y}_n^{(u)}$ is a sampled reference data label for delineating data label classes, $$\frac{1}{N_u} \sum_{n=1}^{N_u}$$

denotes a first normalization with respect to each first data object associated with each unique user, and $$-\frac{1}{U} \sum_{u \in \mathcal{U}}$$

denotes a second normalization with respect to user data.

9. A computer implemented method for training a machine learning model for predicting data labels, the machine learning model having a plurality of parameters, the method comprising:
receiving a first data set comprising one or more first data objects associated with one or more first data labels, each of the one or more first data objects associated with at least one unique user data;
training the machine learning model, the machine learning model comprising a plurality of parameters representative of a user representation model, comprising:
for each unique user representation in the user data:
for each first data object associated with the unique user representation in the user data:
processing, with the user representation model, a respective first data object and associated one or more first data label to fuse the respective first data object and the one or more first data labels associated with the respective first data object to generate a user representation model output;
generating, using a convolutional neural network, a first data object representation of the respective first data object;
fusing the first data object representation and the user representation model output generating a user conditional object representation;
generating a joint embedding space for comparing projections of the user conditional object representation and the one or more first data labels associated with the respective first data object;
updating the plurality of parameters representative of the user representation model based on an error value, the error value based on a maximum similarity of the projections of the respective user conditional object representation and the respective one or more first data labels in the joint embedding space; and
storing the trained machine learning model for predicting data labels;
wherein fusing the respective first data object and the one or more first data labels associated with the respective first data object comprises:
generating a second data object representation of the respective first data object;
generating a first data label representation for a sum of the one or more first data labels associated with the respective first data object;
fusing the second data object representation and the first data label representation; and
processing the fused second data object representation and first data label representation with a plurality of parameters for capturing sequential relationships within data to store interrelationships between respective fused second data object representation and first data label representations.

10. The method of claim 9, wherein the generating the second data object representation of the respective first data object comprises passing the respective first data object through a data object representation model using relation:

$$x_t^{im} = f^{im}(\mathcal{I}_t)$$

where $x_t^{im}$ denotes the second data object representation, $I_t$ denotes the respective first data object, and $f^{im}$ denotes the data object representation model.

11. The method of claim 9, wherein generating the first data label representation for the respective first data object comprises passing the one or more first data labels associated with the respective first data object through a data label representation model function using relation:

$$x_t^{tag} = f^{tag}(y_t)$$

where $x_t^{tag}$ denotes the first data label representation, $y_t$ denotes a sum of the one or more first data labels associated with the respective first data object, and $f^{tag}$ denotes the data label representation model.

12. The method of claim 9, wherein fusing the second data object representation and the first data label representation is based processing the second data object representation and the first data label representation through a fusion function using relation:

$$x_t = \text{fusion}(x_t^{im}, x_t^{tag})$$

where $x_t^{tag}$ denotes the first data object label representation, $x_t^{im}$ denotes the second data object representation, fusion denotes the fusion function, $x_t$ denotes the fused second data object representation and first data label representation.

13. The method of claim 9, fusing the respective first data object representation and user representation model output to generate the user conditional object representation further comprises:

processing the respective first data object representation and user representation model output with a bilinear operator using relation:

$$z_j = v^T W_j u + b_j \; j \in \{1, \ldots, d_c\} \quad 5$$

the bilinear operator comprising a learned weight matrix $W_j \in \mathbb{R}^{d_v \times d_u}$, a learned bias $b_j \in \mathbb{R}$ of the j-th dimension, where $v^T$ denotes the first data object representation, u denotes the user representation model output, and $z=[z_j]_{j=1,\ldots,d_c}$ denotes the user conditional object representation.

14. The method of claim 9, wherein fusing the respective first data object representation and user representation model output to generate the user conditional object representation further comprises processing the respective first data object representation and user representation model output with a Multimodal Tucker Fusion (MUTAN) model for approximating bilinear operators to generate the user conditional object representation.

15. The method of claim 9, wherein the error value is based on a posterior data object label probability established using relation:

$$p(\hat{y}|\mathcal{I}, u; \Theta) = \frac{f(\mathcal{I}, u, \hat{y}; \Theta)}{\sum_{y \in \mathcal{H}^{train}} f(\mathcal{I}, u, y; \Theta)}$$

where '$(\hat{y}_n^{(u)}|\mathcal{I}_t, u;\Theta)$ is the posterior data object label probability for a first user conditional object representation class, $f(\mathcal{I}_t, u, \hat{y};\Theta)$ is a probability of the respective user conditional object representation in the joint embedding space being within the first user conditional object representation class, $\Sigma_{y \in \mathcal{H}^{train}} f(\mathcal{I}_t, u, \hat{y};\Theta)$ and aggregate probability of the user conditional object representation in the joint embedding space being other than the first user conditional object representation class.

16. A non-transitory computer readable medium storing machine interpretable instructions, the machine interpretable instructions, which when executed by a processor, cause the processor to perform a method for training a machine learning model for predicting labels according to a method comprising:

receiving a first data set comprising one or more first data objects associated with one or more first data labels, each of the one or more first data objects associated with at least one unique user data;

training the machine learning model, the machine learning model comprising a plurality of parameters representative of a user representation model, comprising:
for each unique user representation in the user data:
for each first data object associated with the unique user representation in the user data:
processing, with the user representation model, a respective first data object and associated one or more first data labels to fuse the respective first data object and the one or more first data labels associated with the respective first data object to generate a user representation model output;
generating, using a convolutional neural network, a first data object representation of the respective first data object;
fusing the first data object representation and the user representation model output generating a user conditional object representation;
generating a joint embedding space for comparing projections of the user conditional object representation and the one or more first data labels associated with the respective first data object;
updating the plurality of parameters representative of the user representation model based on an error value, the error value based on a maximum similarity of the projections of the respective user conditional object representation and the respective one or more first data labels in the joint embedding space; and
storing the trained machine learning model for predicting data labels;
wherein fusing the respective first data object and the one or more first data labels associated with the respective first data object comprises:
generating a second data object representation of the respective first data object;
generating a first data label representation for a sum of the one or more first data labels associated with the respective first data object;
fusing the second data object representation and the first data label representation; and
processing the fused second data object representation and first data label representation with a plurality of parameters for capturing sequential relationships within data to store interrelationships between respective fused second data object representation and first data label representations.

\* \* \* \* \*